US011931768B2

(12) United States Patent
Gould

(10) Patent No.: US 11,931,768 B2
(45) **Date of Patent: *Mar. 19, 2024**

(54) DISPENSING SYSTEM

(71) Applicant: NORDSON CORPORATION, Westlake, OH (US)

(72) Inventor: Mark A. Gould, Gainesville, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,439

(22) Filed: Aug. 1, 2022

(65) Prior Publication Data

US 2022/0362796 A1 Nov. 17, 2022

Related U.S. Application Data

(62) Division of application No. 16/604,897, filed as application No. PCT/US2018/027541 on Apr. 13, 2018, now Pat. No. 11,433,418.

(60) Provisional application No. 62/488,638, filed on Apr. 21, 2017.

(51) Int. Cl.

*B05C 5/00* (2006.01)
*B05C 5/02* (2006.01)
*F24H 1/10* (2022.01)

(52) U.S. Cl.

CPC ............ *B05C 5/001* (2013.01); *B05C 5/0225* (2013.01); *F24H 1/10* (2013.01)

(58) Field of Classification Search

None

See application file for complete search history.

(56) References Cited

U.S. PATENT DOCUMENTS 1,671,677 A * 5/1928 Keeton .................. F24H 1/142 392/489
2,775,683 A * 12/1956 Kleist ..................... F28D 7/106 392/397

(Continued)

FOREIGN PATENT DOCUMENTS

CN 101541472 A 9/2009
CN 105008872 A 10/2015

(Continued)

*Primary Examiner* — Thor S Campbell

(74) *Attorney, Agent, or Firm* — BakerHostetler

(57) ABSTRACT

A dispensing system for jetting a material onto a substrate is disclosed. The dispensing system includes a plate defining a first surface, a second surface opposite the first surface in a first direction, and at least one slot that extends through the plate from the first surface to the second surface, and an actuator assembly that contains a piezoelectric element and is operatively coupled to the needle. The dispensing system also includes at least one fastener that extends through the actuator assembly and the at least one slot, where the at least one fastener is configured to selectively engage the plate such that 1) in a disengaged configuration, the at least one fastener is movable within the slot and the actuator assembly is movable relative to the plate, and 2) in an engaged configuration, the at least one fastener is not movable within the slot and the actuator assembly is not movable relative to the plate such that a stroke length of the needle is adjusted.

16 Claims, 16 Drawing Sheets

(56) References Cited

U.S. PATENT DOCUMENTS

| | | | | |
|---|---|---|---|---|
| 3,584,194 | A * | 6/1971 | Kautz | B05B 9/002 392/494 |
| 3,835,294 | A * | 9/1974 | Krohn | F24H 1/121 392/494 |
| D388,161 | S * | 12/1997 | Thweatt | D23/314 |
| 5,720,417 | A | 2/1998 | Wuerth et al. | |
| 5,730,359 | A | 3/1998 | Heiko | |
| 6,527,142 | B1 | 3/2003 | Ikushima | |
| 6,610,364 | B1 | 8/2003 | Kweon et al. | |
| 6,943,325 | B2 * | 9/2005 | Pittman | A61H 33/60 4/545 |
| 7,241,131 | B1 * | 7/2007 | Booth | B29C 45/2737 425/549 |
| 7,331,482 | B1 | 2/2008 | Fugere | |
| 7,471,882 | B2 * | 12/2008 | Peebles | G05D 16/0663 392/311 |
| 8,180,207 | B2 * | 5/2012 | Shirai | F24H 9/2028 392/491 |
| 8,424,720 | B2 | 4/2013 | Tracy et al. | |
| 8,545,931 | B2 | 10/2013 | Szuch | |
| 9,636,974 | B2 * | 5/2017 | Leborgne | F24H 1/121 |
| 11,433,418 | B2 * | 9/2022 | Gould | F24H 1/10 |
| 11,448,423 | B2 * | 9/2022 | Yoon | G01K 13/02 |
| 2003/0084845 | A1 | 5/2003 | Prentice et al. | |
| 2004/0084549 | A1 | 5/2004 | Maruyama et al. | |
| 2005/0008353 | A1 * | 1/2005 | Lafitte | F24H 1/142 392/480 |
| 2009/0026291 | A1 | 1/2009 | Shimada | |
| 2010/0089893 | A1 * | 4/2010 | Schlipf | H05B 3/42 219/201 |
| 2010/0175490 | A1 | 7/2010 | Satou | |
| 2014/0263688 | A1 | 9/2014 | Doyle et al. | |
| 2014/0325808 | A1 | 11/2014 | Qi | |
| 2015/0267728 | A1 | 9/2015 | Fliess et al. | |
| 2015/0274371 | A1 | 10/2015 | Fliess et al. | |
| 2016/0004257 | A1 | 1/2016 | Fliess et al. | |
| 2016/0136661 | A1 | 5/2016 | Hong et al. | |
| 2016/0136664 | A1 | 5/2016 | Hong et al. | |
| 2016/0193624 | A1 | 7/2016 | Ikushima | |
| 2016/0339470 | A1 | 11/2016 | Macindoe et al. | |
| 2016/0339471 | A1 | 11/2016 | Bittner et al. | |
| 2017/0135158 | A1 * | 5/2017 | Schlipf | H05B 3/40 |
| 2018/0221910 | A1 | 8/2018 | Burzo et al. | |
| 2018/0311697 | A1 | 11/2018 | Macindoe et al. | |
| 2019/0054491 | A1 | 2/2019 | Reuter et al. | |
| 2019/0337008 | A1 | 11/2019 | Gould et al. | |
| 2019/0376617 | A1 | 12/2019 | Ikushima | |
| 2022/0362796 | A1 * | 11/2022 | Gould | B05C 5/0225 |

FOREIGN PATENT DOCUMENTS

| | | | |
|---|---|---|---|
| CN | 105050731 | A | 11/2015 |
| CN | 105604926 | A | 5/2016 |
| CN | 205341186 | U | 6/2016 |
| CN | 205463039 | U | 8/2016 |
| CN | 107635675 | A | 1/2018 |
| DE | 202015106069 | U1 | 12/2015 |
| EP | 0455471 | A2 | 11/1991 |
| EP | 1724090 | A1 | 11/2006 |
| JP | 09-271709 | A | 10/1997 |
| JP | 09-299860 | A | 11/1997 |
| JP | 10-128217 | A | 5/1998 |
| JP | 3025336 | B2 | 3/2000 |
| JP | 2006-142214 | A | 6/2006 |
| JP | 2007-313485 | A | 12/2007 |
| JP | 2008-540087 | A | 11/2008 |
| JP | 2010-201675 | A | 9/2010 |
| JP | 2012-187577 | A | 10/2012 |
| KR | 10-1614312 | B1 | 4/2016 |
| KR | 10-2016-0137417 | A | 11/2016 |
| WO | 2017/023895 | A1 | 2/2017 |

* cited by examiner

DISPENSING SYSTEM

CROSS REFERENCE TO RELATED APPLICATIONS

This application is a divisional of U.S. patent application Ser. No. 16/604,897, filed Oct. 11, 2019, which is a National Stage Application of International Patent Application No. PCT/US2018/027541, filed Apr. 13, 2018, claims the benefit of U.S. Provisional Patent App. No. 62/488,638, filed Apr. 21, 2017, the disclosure of which is hereby incorporated by reference in its entirety.

TECHNICAL FIELD

This disclosure generally relates to dispensing systems, and more particularly relates to dispensing systems for heating a material and dispensing the heated material onto a substrate.

BACKGROUND

Known dispensing systems for jetting fluid materials such as solder paste, conformal coatings, encapsulants, underfill material, and surface mount adhesives generally operate to dispense small volumes of fluid material to a substrate by rapidly contacting a valve seat with a needle to create a distinct, high pressure pulse that ejects a small volume of fluid material from the dispenser. However, operation of such a dispensing system presents many issues, such as ineffective heating of the fluid throughout the flow path, inaccessibility of wetted parts for removing excess material, heat transfer to unintended parts of the applicator, and difficulty in accurately adjusting the stroke length of the needle to accommodate a particular jetting operation.

There is a need, therefore, for dispensing systems and methods of operating such applicators that address these and other problems.

SUMMARY

One embodiment of the present disclosure is a dispensing system for jetting a material onto a substrate. The dispensing system includes a plate defining a first surface, a second surface opposite the first surface in a first direction, and at least one slot that extends through the plate from the first surface to the second surface, and an actuator assembly that contains a piezoelectric element, where the actuator assembly is operatively coupled to a needle. The dispensing system also includes at least one fastener that extends through the actuator assembly and the at least one slot, where the at least one fastener is configured to selectively engage the plate such that 1) in a disengaged configuration, the at least one fastener is movable within the slot and the actuator assembly is movable relative to the plate, and 2) in an engaged configuration, the at least one fastener is not movable within the slot and the actuator assembly is not movable relative to the plate. The piezoelectric element, upon receiving a charge, is configured to move the actuator assembly relative to the needle when the fastener is in the disengaged configuration such that a stroke length of the needle is adjusted.

Another additional embodiment of the present disclosure is a method of adjusting a stroke length of a needle connected to an actuator assembly, where the actuator assembly is coupled to at least one plate. The method includes disengaging the actuator assembly from the at least one plate, such that the actuator assembly is capable of moving relative to the at least one plate, and providing a charge to a piezoelectric element of the actuator assembly. The method also includes moving the actuator assembly relative to the needle and the at least one plate, and engaging the actuator assembly with the at least one plate.

An additional embodiment of the present disclosure is a heater for heating material in an material applicator. The heater includes a housing that defines a first end, a second end opposite the first end, and a cavity that extends from the first end to the second end, where the cavity is configured to receive a supply of material, the housing further defining an outer surface that includes a first helical groove and a second helical groove, where the first and second helical grooves extend from the first end to the second end. The heater also includes a temperature sensor disposed in the first helical groove, a heater wire disposed in the second helical groove, an insulating layer disposed around the housing, and a sleeve disposed around the insulating layer.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

DETAILED DESCRIPTION OF ILLUSTRATIVE EMBODIMENTS

Figure 1:
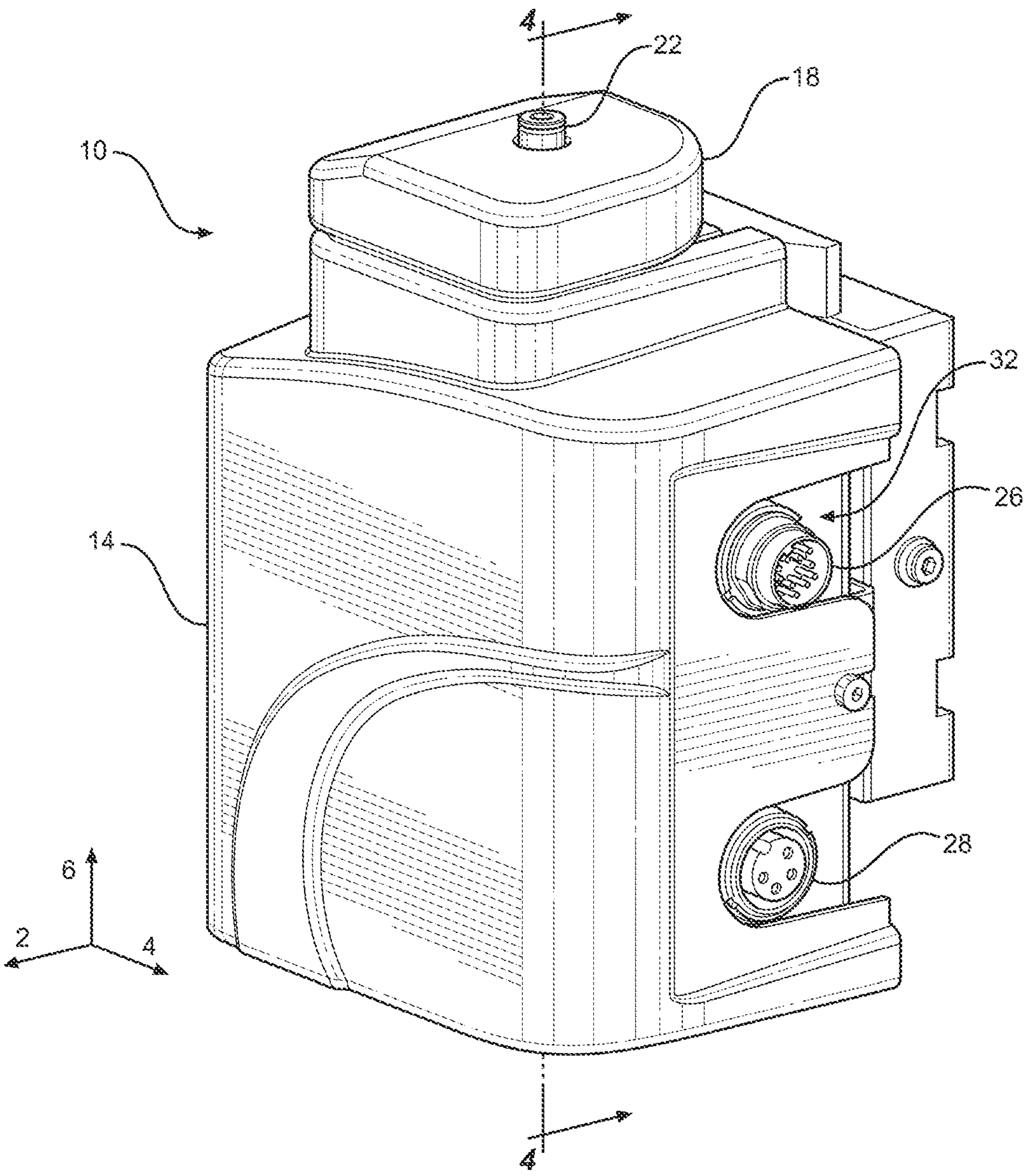
FIG. 1 is a perspective view of a dispensing system according to an embodiment of the present disclosure.

An dispensing system 10 includes a syringe heater 40, a jetting dispenser assembly 300, and a plate assembly 47. The plate assembly 47 includes a top plate 48 and a bottom plate 52 that each partially defines a plate channel 252 that is in fluid communication with the syringe heater 40 and the jetting dispenser assembly 300. The dispensing system 10 also includes a cap 18 that is configured to seal a syringe (not shown) within the syringe heater 40. Further, the dispensing system 10 includes an actuator 60 that contains a piezoelectric element, where the actuator 60 is configured to selectively move a needle 304 of the jetting dispenser assembly 300. Certain terminology is used to describe the dispensing system 10 in the following description for convenience only and is not limiting. The words "right," "left," "lower," and "upper" designate directions in the drawings to which reference is made. The words "inner" and "outer" refer to directions toward and away from, respectively, the geometric center of the description to describe the dispensing system 10 and related parts thereof. The words "forward" and "rearward" refer to directions in a longitudinal direction 2 and a direction opposite the longitudinal direction 2 along the dispensing system 10 and related parts thereof. The terminology includes the above-listed words, derivatives thereof, and words of similar import.

Unless otherwise specified herein, the terms "longitudinal," "lateral," and "vertical" are used to describe the orthogonal directional components of various components of the dispensing system 10, as designated by the longitudinal direction 2, lateral direction 4, and vertical direction 6. It should be appreciated that while the longitudinal and lateral directions 2 and 4 are illustrated as extending along a horizontal plane, and the vertical direction 6 is illustrated as extending along a vertical plane, the planes that encompass the various directions may differ during use.

Figure 2:
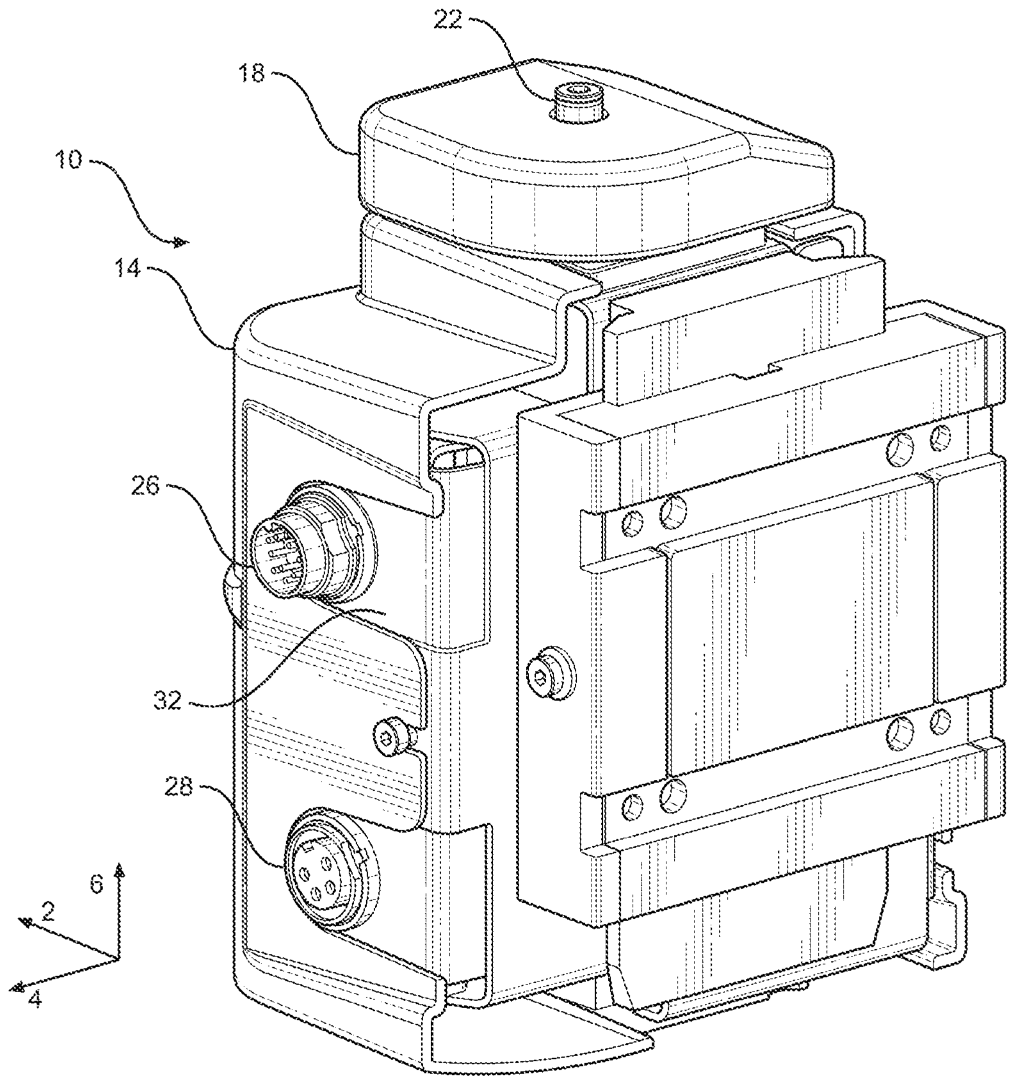
FIG. 2 is an alternative perspective view of the dispensing system shown in FIG. 1.

Embodiments of the present invention include an dispensing system 10 for applying a material, such as a hot melt adhesive, to a substrate during product manufacturing. In particular, the material may be a polyurethane reactive (PUR) hot melt. Referring to FIGS. 1-2, the dispensing system 10 includes a cover 14 that defines a substantial portion of the exterior of the dispensing system 10. The dispensing system 10 also includes a first connector 26 and a second connector 28. The first connector 26 may define a male connection comprising a plurality of tines, and is configured to connect to a wire (not shown) that connects the first connector 26 to a power source, such that the dispensing system 10 receives a power input through the first connector 26. The second connector 28 may define a female connection comprising a plurality of recesses, and is configured to connect to a wire (not shown) that connects the second connector 28 to a controller (not shown), such that information is transmitted to and from the dispensing system 10 through the second connector 28. The controller may be a general purpose computer, tablet, laptop, smartphone, etc. However, the first and second connectors 26 and 28 may be configured as other types of connectors as desired. In other embodiments, the dispensing system 10 may transmit information to a controller wirelessly via Bluetooth or Wi-Fi. The first and second connectors are configured to be mounted to a circuitry housing 32, which contains a circuit board 36.

The dispensing system 10 includes a cap 18 that is configured to cover an opening through which a syringe (not shown) carrying material may be inserted. An input connector 22 extends through the cap 18, and defines an air passage 23 that is in fluid communication with the syringe when the syringe is disposed within the dispensing system 10. The input connector 22 may be connected to a source of pressurized air, such that pressurized air passes through the input connector 22 and forces the material through the dispensing system 10.

Figure 4:
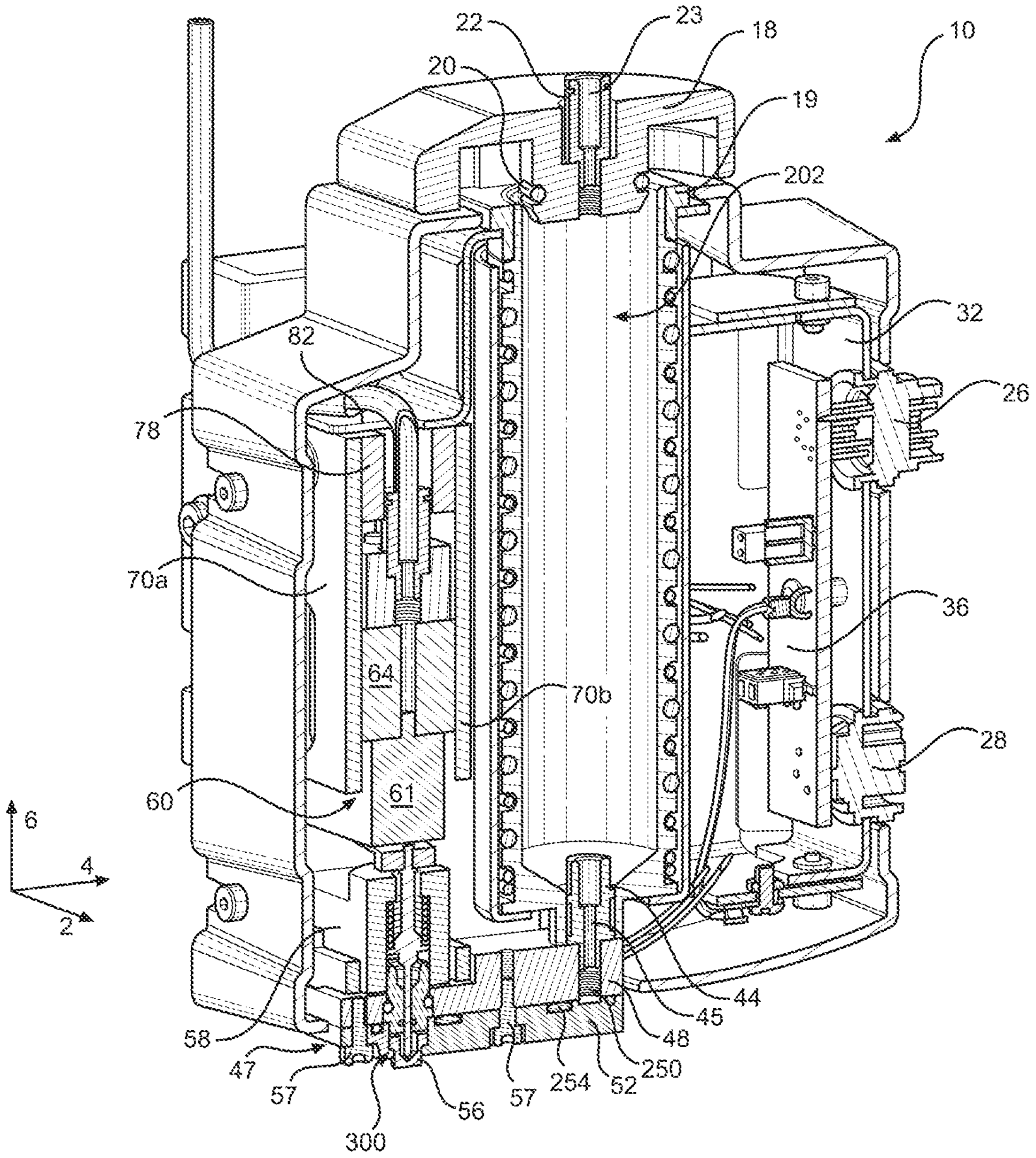
FIG. 4 is a cross-sectional view of the dispensing system shown in FIG. 1, taken along line 4-4 shown in FIG. 1.
Figure 5:
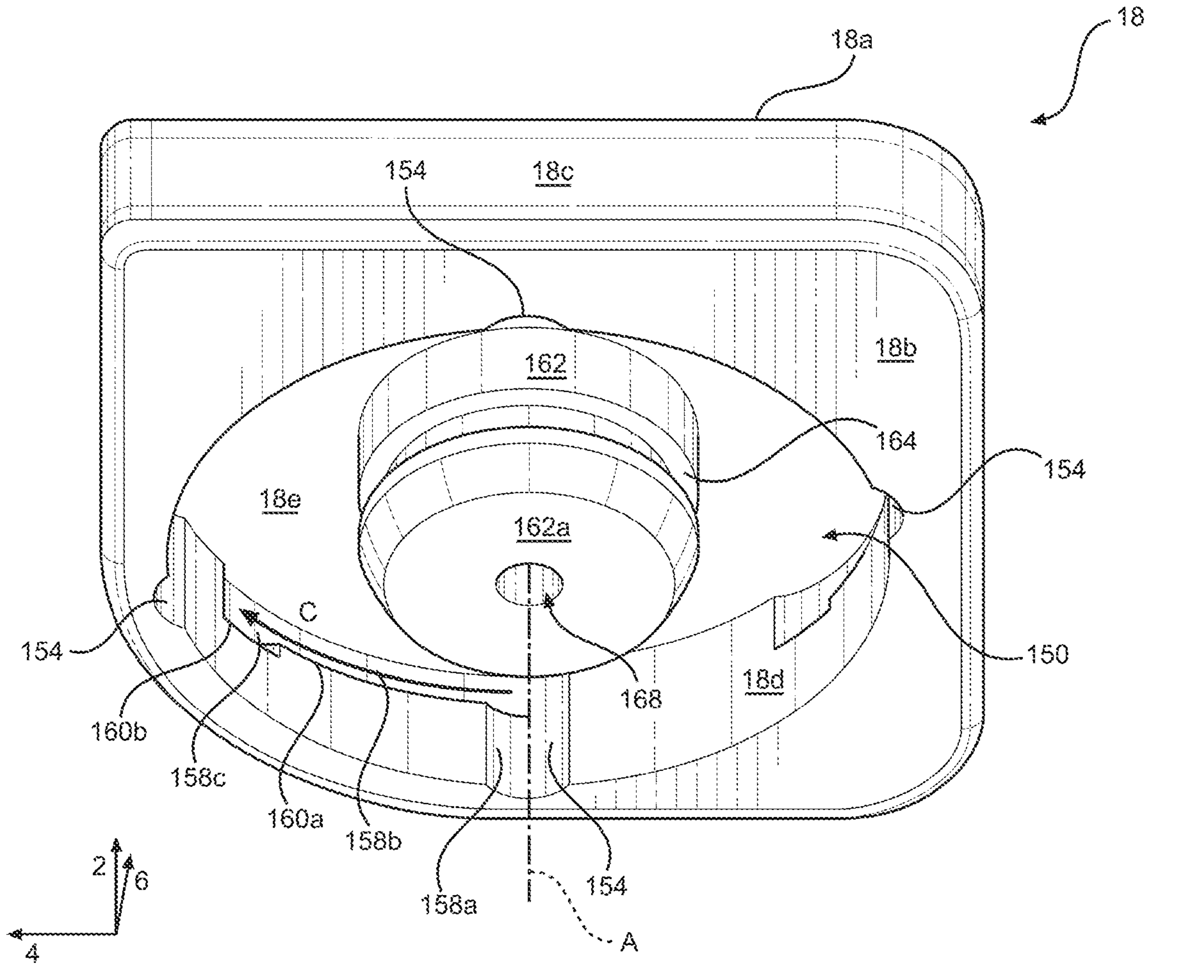
FIG. 5 is a perspective view of a cap of the dispensing system shown in FIG. 1.

Referring to FIG. 5, the cap 18 defines a top surface 18*a*, a bottom surface 18*b* opposite the top surface 18*a*, and an outer side surface 18*c* that extends from the top surface 18*a* to the bottom surface 18*b*. The cap 18 can also define a recess 150 that extends from the bottom surface 18*b* into the cap 18 towards the top surface 18*a* along the vertical direction 6. The recess 150 may be partially defined by an inner side surface 18*d* of the cap 18, as well as an inner top surface 18*e* of the cap. The inner top surface 18*e* of the cap may be parallel to the top surface 18*a* and/or the bottom surface 18*b*, and is disposed between the top and bottom surfaces 18*a* and 18*b* along the vertical direction 6. The cap 18 may define a circular projection 162 that extends along the vertical direction 6 away from the inner top surface 18*e* of the cap 18 and terminates at a bottom surface 162*a*. The projection 162 may be configured such that the bottom surface 162*a* is aligned along the vertical direction with the bottom surface 18*b* of the cap. However, the bottom surface 162*a* of the projection 162 may be offset from the bottom surface 18*b* of the cap along the vertical direction 6. The projection 162 may define a seal groove 164 that is configured to receive a seal 20, such as an O-ring (see FIG. 4), as well as a passage 168. The passage 168, which is configured to receive the input connector 22, extends from the bottom surface 162*a*, through the projection 162, to the top surface 18*a* of the cap 18. The passage 168 defines a central axis A, which may be centrally disposed on the projection 162.

The cap 18 further defines at least one channel 154 that is partially defined by the bottom surface 18*b*, the inner side surface 18*d*, and the inner top surface 18*e*. The cap 18 in the depicted embodiment defines four channels 154, though the cap 18 may define any other number of channels 154 as desired. The channels 154 may be equidistantly spaced around the recess 150, or the channels 154 may be inconsistently offset. Though the cap 18 may include more than one channel 154, an exemplary channel 154 will be described below. Each of the additional channels may be similarly configured to the channel 154 described.

The channel 154 may include more than one portion. For example, the channel 154 may include a first portion 158*a* that extends from the bottom surface 18*b* to the inner top surface 18*e* along the vertical direction 6. The first portion 158*a* is depicted as defining a semi-circular shape, though the first portion 158*a* may define an alternative shape as desired. The channel 154 may also include a second portion 158*b* that is defined by the inner side surface 18*d*, the inner top surface 18*e*, and a first ledge 160*a* that faces the inner top surface 18*e*. The second portion 158*b* may extend from the first portion 158*a* along a curved circumferential direction C that is radially offset from the central axis A, and may be completely offset from the bottom surface 18*b* of the cap 18 along the vertical direction 6. The channel 154 may further define a third portion 158*c* that extends from the second portion 158*b* along the vertical direction 6 towards the bottom surface 18*b* of the cap 18. As such, the third portion 158*c* of the channel 154 may be radially offset from the first portion 158*a* along the circumferential direction C. The third portion 158*c* may be defined by a second ledge 160*b* that is offset from the first ledge 160*a* along the vertical direction 6. In particular, the second ledge 160*b* may be spaced between the bottom surface 18*b* and the first ledge 160*a* along the vertical direction 6. The first, second and third portions 158*a*-158*c* of the channel 154 define a path for receiving a head 111 of a cap fastener 110, as will be described below.

Figure 3:
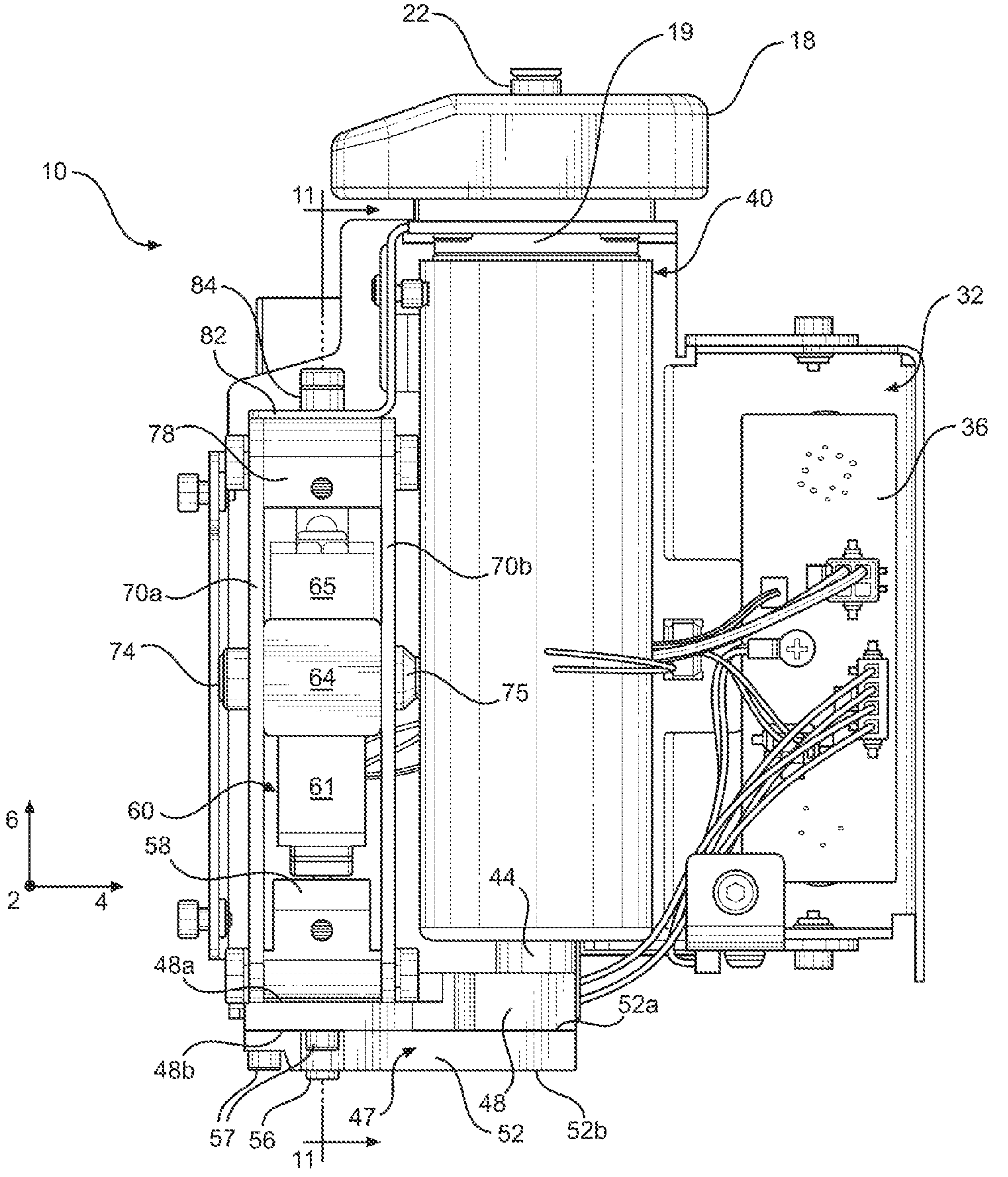
FIG. 3 is a side view of the dispensing system shown in FIG. 1, with the cover hidden.
Figure 6:
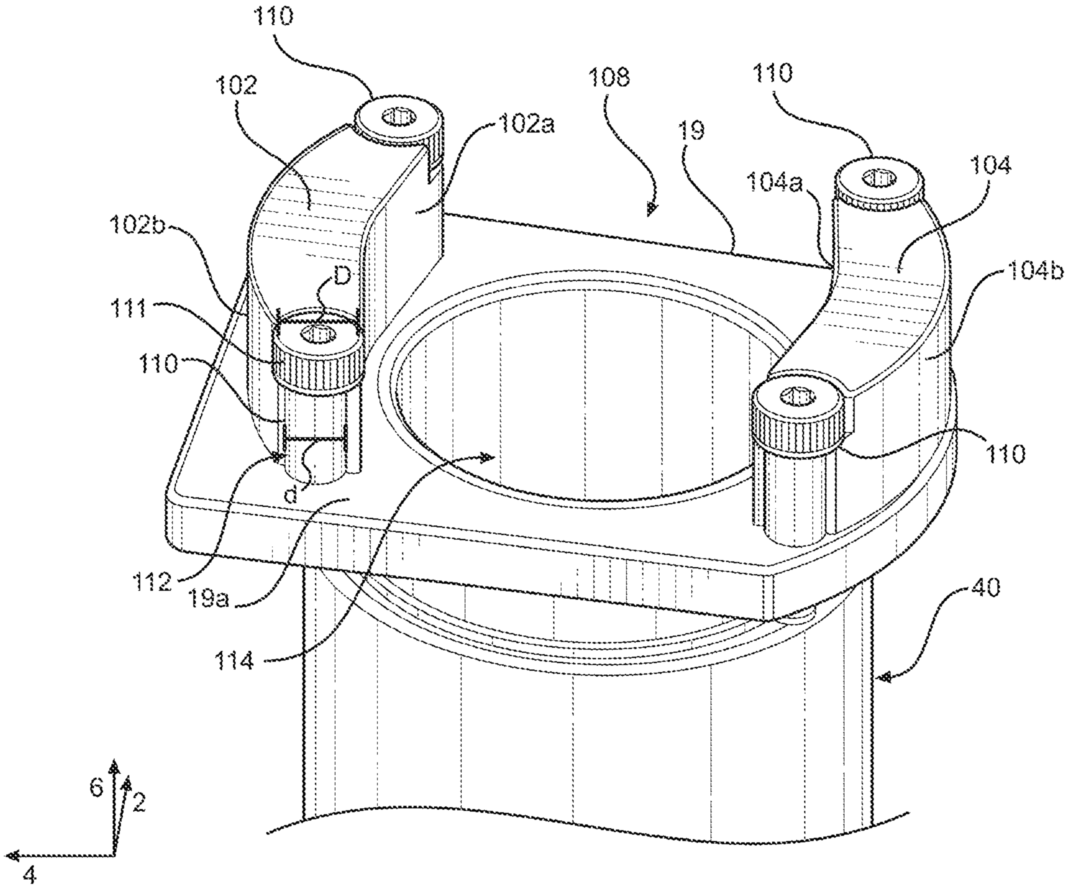
FIG. 6 is a perspective view of a cap seat of the dispensing system shown in FIG. 1.

Referring to FIGS. 3, 4, and 6, the dispensing system 10 further includes a cap seat 19 disposed between the cap 18 and a syringe heater 40. The cap seat 19 may be releasably coupled to the dispensing system 10, such that the cap seat 19 secures the syringe heater 40 within the dispensing system 10 when the cap seat 19 is attached to the dispensing system 10, and provides an opening for removing the syringe heater 40 from the dispensing system 10 when the cap seat 19 is detached from the dispensing system 10. The cap seat 19 defines a top surface 19*a* that is configured to face the cap 18, and a syringe body channel 114 that extends from the top surface 19*a* and through the cap seat 19. The syringe body channel 114 is sized such that a syringe can be inserted through the syringe body channel 114 into the syringe heater 40. The cap seat 19 may also define at least one ledge that extends from the top surface 19*a* along the vertical direction 6. In the depicted embodiment, the cap seat 19 defines a first ledge 102 and a second ledge 104 spaced from the first ledge 102 along the lateral direction 4. The first ledge 102 defines an inner surface 102*a* and an outer surface 102*b* spaced from the inner surface 102*a* along the lateral direction 4, and the second ledge defines an inner surface 104*a* and an outer surface 104*b* spaced from the inner surface 104*a* along the lateral direction. The inner surface 102*a* of the first ledge 102 may face the inner surface 104*a* of the second ledge 104. The inner surfaces 102*a* and 104*a* of the first and second ledges 102 and 104 may be sized to define an upper syringe channel 108, which extends between the first and second ledges 102 and 104 along the longitudinal direction 2. The upper syringe channel may be sized to receive an upper flange of the syringe (not shown), such that when the upper flange is received in the upper syringe channel 108, the syringe is rotationally fixed within the syringe body channel 114.

The cap seat 19 may also include at least one cap fastener 110 that extends from the top surface 19*a* along the vertical direction 6. The depicted embodiment includes four elongate members 110, each of which are each disposed at a respective end of the first and second ledges 102 and 104. However, more or less elongate members can be included as desired. Each cap fastener 110 may define a head 111 and a central portion 112 that extends from the head 111 to the top surface 19*a* of the cap seat 19. The central portion 112 defines a maximum diameter d, and the head 111 defines a maximum diameter D. The cap fastener 110 may be defined such that the maximum diameter D of the head 111 is greater than the maximum diameter d of the central portion 112.

110 In this embodiment, the central portion 112 of the cap fasteners 110 extends through the top surface 19*a* of the cap seat 19, and may be configured to releasably engage a portion of the dispensing system 10, such that the cap fasteners 110 secure the cap seat 19 in place. Further, rotation of the cap fasteners 110 may adjust the displacement of the heads 111 of the cap fasteners 110 from the top surface 19*a* of the cap seat 19 along the vertical direction 6. Though four cap fasteners 110 are depicted, the dispensing system 10 can include more or less cap fasteners 110 as desired. For example, the applicator can include two cap fasteners, three cap fasteners, or more than four cap fasteners. In the depicted embodiment, the cap fasteners are configured as threaded fasteners, though other types of cap fasteners are contemplated.

In operation, an operator of the dispensing system 10 may first insert the syringe body through the syringe body channel 114, such that the syringe flange is disposed in the upper syringe channel 108. At this point, the syringe is rotationally fixed relative to the syringe heater 40 and the cap seat 19 due to the interaction between the syringe flange and the first and second ledges 102 and 104, but may still be removed from the syringe heater 40 along the vertical direction 6. The cap 18 is then placed into engagement with the cap seat 19. The operator of the dispensing system 10 must first align the head 111 of each of the elongate members 110 with a respective one of the channels 154—particularly, the first portion 158*a* of the channels 154. Because the elongate members 110 must be aligned with the first portions 158*a* of the channels 154 before the cap 18 can engage the cap seat 19, the cap 18 can only engage the cap seat 19 in a select number of rotational orientations. Once the elongate members 110 are aligned with the first portions 158*a* of the channels 154, the cap is lowered in the vertical direction 6 such that the head 111 of the elongate members 110 slides along the first portions 158*a* of the channels 154.

Once the cap 18 has been lowered a certain distance, the heads 111 of the elongate members or cap fasteners 110 will contact the inner top surface 18*e* of the cap 18, thus preventing any further relative vertical movement between the cap 18 and the cap seat 19. At this point, the operator rotates the cap 18 such that the heads 111 of the elongate members 110 slide along the second portion 158*b* of the channel 154 along the circumferential direction C. Because the second portion 158*b* of the channels 154 extend from the first portion 158*a* in a single curved circumferential direction C, the cap 18 can only be rotated in one direction when the heads 111 of the elongate members 110 contact the inner top surface 18*e*. Once the heads 111 of the elongate members 110 are received in the second portion 158*b* of the channel 154, the cap 18 can no longer be moved vertically away from the cap seat 19, as the heads 111 of the elongate members 110 will be blocked by the first ledge 160*a*. Then, the operator of the dispensing system 10 continues rotating the cap 18 until the heads 111 of the elongate members 110 reach the end of the second portion 158*b* of the channel 154. At this point, the operator can release the cap 18.

At this stage, under non-operating conditions, the cap 18 will still rotatable along the second portion 158*b* of the channel 154. However, under operating conditions, when a syringe containing material is contained within the syringe heater 40, pressurized air is being pumped through the cap 18 via the input connector 22. As such, the pressure within the syringe body channel 114 will be greater than the air pressure of the ambient environment outside the dispensing system 10. Because of this, when the heads 111 of the elongate members 110 reach the end of the second portion 158*b* of the channel 154, the pressure within the syringe body channel 114 pushes up against the cap 18 and forces the heads 111 of the elongate members 110 into the third portion 158*c* of the channel 154. This results in the heads 111 of the elongate members contacting the second ledge 160*b*. Since the second ledge 160*b* is positioned between the first ledge 160*a* and the bottom surface 18*b* of the cap 18 along the vertical direction 6, the cap 18 is rotationally fixed relative to the cap seat 19. In this position, the projection 162 may function to seal the syringe body channel 114, which prevents material from exiting the top of the syringe heater 40. The seal 20, which is disposed in the seal groove 164 of the projection 162, may bias against the cap seat 19 to further aid in preventing material leakage.

To remove the cap 18 from the cap seat 19, the operator must first relieve the pressure from within the syringe body channel 114, which disengages the heads 111 of the elongate members 110 from the second ledge 160*b*. When this is done, the heads 111 of the elongate members 110 can contact the inner top surface 18*e* of the cap 18. This contact will provide a physical indication to the operator that the heads 111 of the elongate members 110 are capable of being rotated through the second portion 158*b* of the channel, after which the cap 18 can be vertically lifted away from the cap seat 19.

Now referring to FIGS. 3, 4, and 6-8, the syringe heater 40 will be described in greater detail. The syringe heater 40 functions to provide heat to the material in the syringe, which keeps the material at a desirable temperature for jetting and flowing through the applicator, as well as monitor the temperature of the material within the syringe to avoid unintentional temperature peaks or dips in temperature of the material. The syringe heater 40 includes a housing 200 that defines a first end 200*a* and a second end 200*b*. The housing 200 is hollow, such that the housing 200 defines a syringe cavity 202 that is configured to receive a majority of a syringe when the syringe is placed within the syringe heater 40. As such, the syringe cavity 202 is open to the syringe body channel 114 of the cap seat 19. The housing 200 may be formed of a metal, such as aluminum. However, the housing 200 may be formed of any material with sufficient conductivity to allow heat to pass through and heat the material within the syringe.

The syringe heater 40 further defines an outer surface 201 that extends from the first end 200*a* of the syringe heater 40 to the second end 200*b*. The outer surface 201 may define a plurality of helical grooves that extend along the outer surface from the first end 200*a* to the second end 200*b*. In the depicted embodiments, the housing 200 defines a first helical groove 224 and a second helical groove 228. However, in other embodiments the housing 200 may define more than two helical grooves. The first helical groove 224 defines a first diameter $d_1$ measured along the vertical direction 6, and the second helical groove 228 defines a second diameter $d_2$ measured along the vertical direction 6. The first diameter $d_1$ may be smaller than the second diameter dz. Alternatively, the first and second diameters $d_1$ and $d_2$ may be equally sized, or the second diameter $d_2$ may be larger than the first diameter $d_1$. The first and second helical grooves 224 and 228 may be configured such that they extend from the first end 200*a* of the housing 200 to the second end 200*b* without intersecting.

The syringe heater 40 also includes a temperature sensor 204 that defines a first end 204*a* and a second end 204*b*, as well as a heating element 208 that defines a first end 208*a* and a second end 208*b*. The heating element 208 may be disposed in the first helical groove 224, such that the heating element 208 extends helically around the housing 200 from the first end 200*a* to the second end 200*b*. Similarly, the temperature sensor 204 may be disposed in the second helical groove 228, such that the temperature sensor 204 extends helically around the housing 200 from the first end 200*a* to the second end 200*b*. The temperature sensor 204 may extend through an entire length of the second helical groove 228, and continue to extend such that the first end 204*a* of the temperature sensor 204 is disposed outside the second helical groove 228 at the first end 200*a* of the housing 200, and the second end 204*b* of the temperature sensor 204 is disposed outside the second helical groove 228 at the second end 200*b*. Likewise, the heating element 208 may extend through an entire length of the first helical groove 224, and continue to extend such that the first end 208*a* of the heating element 208 is disposed outside the first helical groove 224 at the first end 200*a* of the housing 200, and the second end 208*b* of the heating element 208 is disposed outside the first helical groove 224 at the second end 200*b*. In one embodiment the temperature sensor 204 is a coreless temperature sensor, and the heating element 208 is a heating wire. When the first groove 224 has the smaller diameter $d_1$ than the second diameter $d_2$, the outer surface 201 of the housing 200 contacts the heating element 208 with a maximum surface area, which allows for maximum heating control and a uniform distribution of energy.

Figure 7:
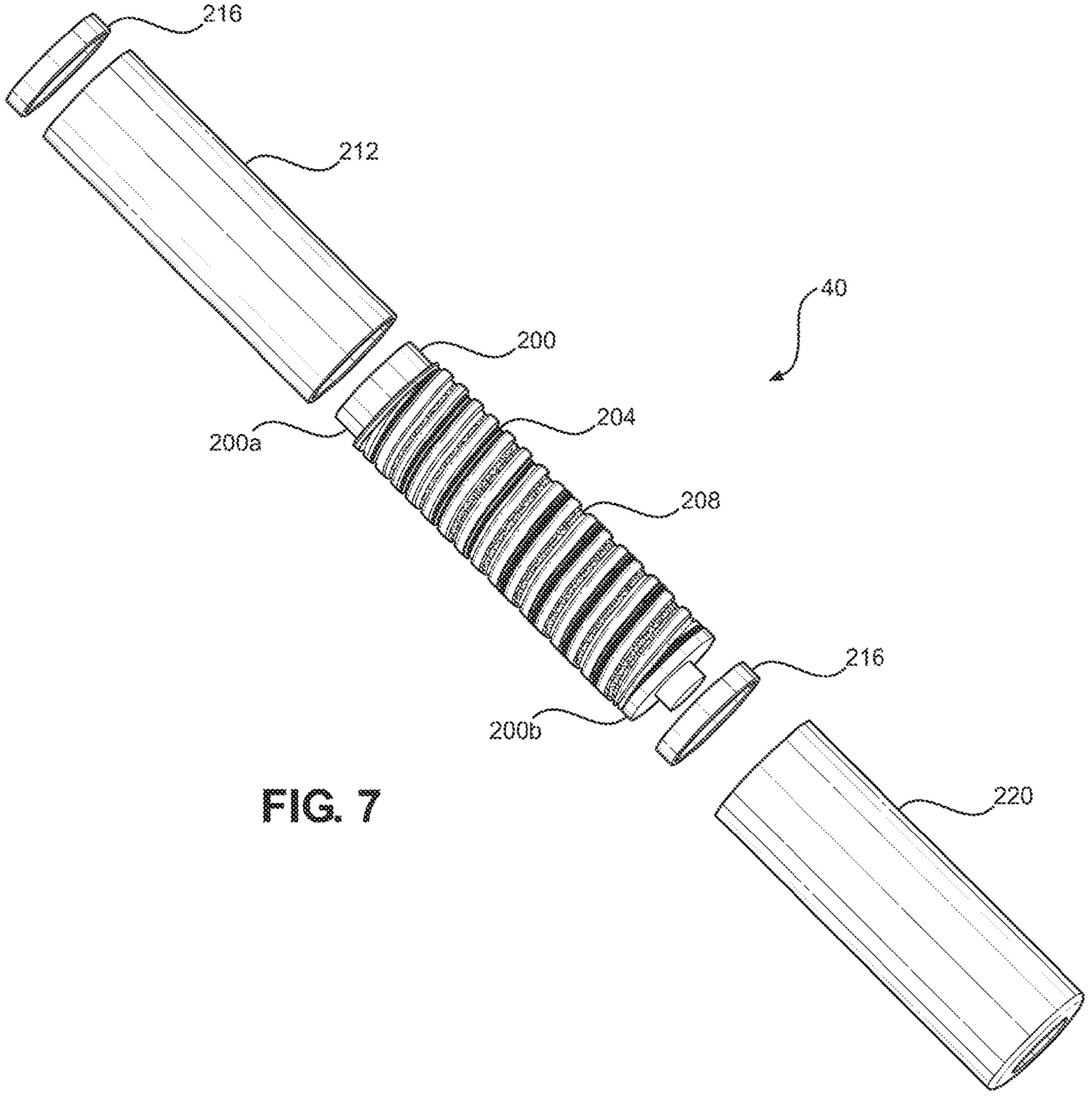
FIG. 7 is an exploded view of a syringe heater of the dispensing system shown in FIG. 1.
Figure 8:
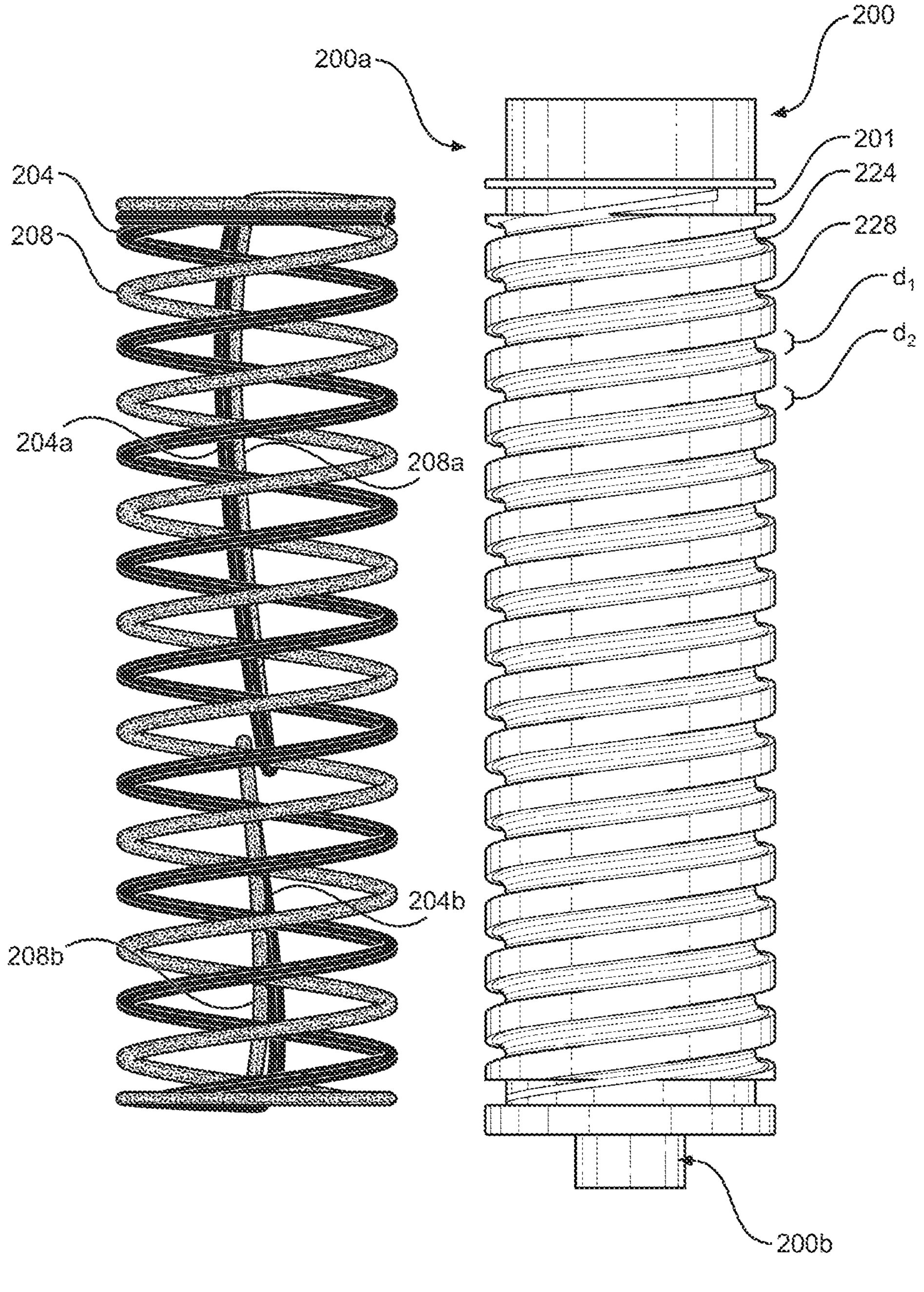
FIG. 8 is a side view of certain components of the syringe heater shown in FIG. 7.

Continuing with FIGS. 7 and 8, the syringe heater 40 may include an insulating element 212 that wraps around the housing 200, the temperature sensor 204, and the heating element 208. The insulating element 212 may comprises a unitary sleeve that is configured to be disposed around the housing 200, or may comprise a length of material that is wrapped around the housing 200. However, when the insulating element 212 is disposed around the housing, at least a portion of the first and second ends 204*a*, 208*a* and 204*b*, 208*b* of the temperature sensor 204 and the heating element 208 protrude out of the insulating element 212. In one embodiment, the insulating element 212 is polyimide tape. In embodiments where the insulating element 212 is polyimide tape, the insulating element 212 may wrap around the housing 200 more than once. For example, the insulating element 212 may wrap around the housing two, three, or more times. The syringe heater 40 may also include securing elements 216 that are configured to secure the temperature sensor 204 and the heating element 208 within the second groove 228 and the first groove 224, respectively. In the depicted embodiments, the syringe heater 40 includes two securing elements 216. However, the inclusion of more or less securing elements 216 is contemplated. The depicted embodiment includes two securing elements 216, where a first securing element 216 is disposed around the first end 200*a* of the housing, and a second securing element 216 is disposed around the second end 200*b* of the housing 200. The securing elements 216 may comprise polyimide tape, and may function to secure portions of the temperature sensor 204 and the heating element 208 within the ends of the second and first helical grooves 228 and 224, respectively. When the securing element 216 and the insulating element 212 both comprise polyimide tape, the securing element 216 may comprise a polyimide tape that has a smaller width than the polyimide tape that comprises the insulating element 212. The insulating elements 212 and/or the securing elements 216 may function to provide thermal and electrical insulation to the housing 200, temperature sensor 204, and the heating element 208.

Figure 16:
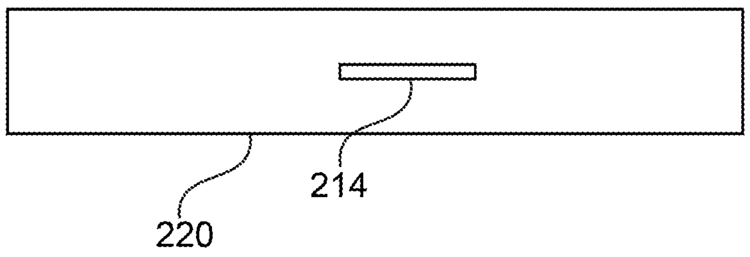
FIG. 16 is a schematic view of an embodiment of a sleeve with a slot or notch.

The syringe heater 40 may further include a sleeve 220. The sleeve 220 may be disposed around the other elements of the syringe heater 40, i.e., the sleeve 220 may be disposed around the housing 200, the temperature sensor 204, the heating element 208, the insulating element 212, and the securing elements 216. The sleeve 220 may define a slot or notch 214 (e.g., as schematically shown in FIG. 16), through which the first and second ends 204*a* and 204*b* of the temperature sensor 204 and the first and second ends 208*a* and 208*b* of the heating element 208 may extend, which allows the first and second ends 204*a* of the temperature sensor 204 and the first and second ends 208*a* and 208*b* of the heating element 208 to connect to electrical elements of the dispensing system 10. This provides the temperature sensor 204 and the heating element 208 with a means for receiving power and transmitting information to external elements of the dispensing system 10. In one embodiment, the sleeve 220 is a heat-shrink sleeve (e.g., a heat shrink braided sleeve).

A method for manufacturing and/or assembling the syringe heater 40 will now be described. First, the housing 200 may be manufactured, such that the housing 200 defines a syringe cavity 202 that is sized to receive a syringe (not shown) that contains material. For example, the housing 200 may be die cast from aluminum. Then, the first and second grooves 224 and 228 may be machined into the outer surface 201 of the housing 200. Alternatively, the housing 200 may be initially manufactured to include the first and second grooves 224 and 228. After the housing 200 has been completely manufactured, the temperature sensor 204 may be wound around the housing 200. To wind the temperature sensor 204 around the housing, a portion of the temperature sensor 204 may be placed within the second helical groove 228 near the second end 200*b* of the housing 200. Then the temperature sensor 204 may be wound around the housing 200 in the second helical groove 228 from the second end 200*b* to the first end 200*a* of the housing 200 such that when completely wound, the first and second ends 204*a* and 204*b* will extend out of the second helical groove 228. The heating element 208 may be similarly wound in the first helical groove 224, such that when completely wound, the first and second ends 208*a* and 208*b* extend out of the first helical groove 224.

After the temperature sensor 204 and the heating element 208 have been completely wound in the second and first helical grooves 228 and 224, respectively, the temperature sensor 204 and the heating element 208 may be secured to the housing 200 within the second and first helical grooves 228 and 224 using securing elements 216. While maintaining the temperature sensor 204 and the heating element 208 taught within the second and first helical grooves 228 and 224, a securing element 216 may be wound around or disposed over the portions of the temperature sensor 204 and the heating element 208 at the first end 200*a* of the housing 200, and a securing element 216 may be wound around or disposed over the portions of the temperature sensor 204 and the heating element 208 at the second end 200*b* of the housing 200.

Alternatively, the temperature sensor 204 and the heating element 208 may be separately secured to the housing 200 via securing elements 216. According to this method, the temperature sensor 204 is secured to the housing with a securing element 216 as described above, but before the heating element 208 is disposed in the first helical groove 224. After the temperature sensor 204 has been secured using two securing elements 216, the heating element 208 is disposed in the first helical groove 224, wound around the housing 200, and secured to the housing using two additional securing elements 216, as described above.

Figure 15:
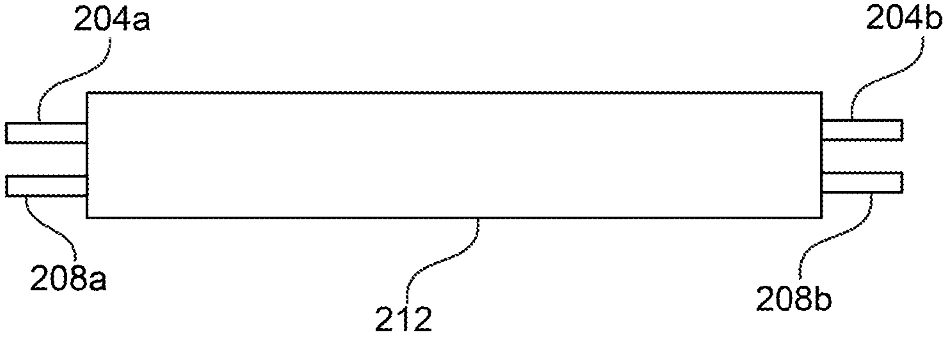
FIG. 15 is a schematic view of an insulating element and exposed ends of a temperature sensor and a heating element.

After the temperature sensor 204 and the heating element 208 have been secured within the second and first helical grooves 228 and 224, respectively, the insulating element 212 may be disposed over the housing 200, the temperature sensor 204, and the heating element 208. For example, the insulating element 212 may be wound around the housing until the housing 200 is substantially covered by insulating element 212. However, a portion of the first and second ends 204*a*, 208*a*, and 204*b*, 208*b* of the temperature sensor 204 and the heating element 208 may be left exposed and uncovered by the insulating element 212 (e.g., as schematically represented in FIG. 15). Then, the sleeve 220 is disposed over the insulating element 212, such that the sleeve 220 substantially covers the housing 200. The sleeve 220 may include a slot or notch 214 (e.g., as schematically shown in FIG. 16) that allows the first and second ends 204*a*, 208*a*, and 204*b*, 208*b* of the temperature sensor 204 and the heating element 208 to be drawn through the sleeve 220. Alternatively, upon sliding the sleeve 220 over the housing 200, the sleeve 220 may be cut to form such a slot. In an embodiment where the sleeve 220 comprises a heat-shrink sleeve, after the sleeve 220 is disposed around the housing 200 and the first and second ends 204*a*, 208*a*, and 204*b*, 208*b* of the temperature sensor 204 and the heating element 208 are drawn through a slot in the sleeve 220, the sleeve 220 may be shrunk onto the housing 200 using a heat gun (not shown). After the sleeve 220 has been shrunk, if the sleeve 220 includes any extra material at either end of the housing 200, the sleeve 220 may be manually trimmed to substantially conform to the length of the housing 200.

The syringe heater 40 described above provides several advantages. The use of the heating element 208 disposed helically around the housing 200 in the first groove 224 ensures uniform distribution of heat to the material, while also reducing the time to heat the material in the syringe. Also, the heating element 208 has a low mass, and as a result the syringe heater 40 is relatively lightweight compared to conventional syringe heaters. Further, the insulating element 212 and the sleeve 220 provide thermal isolation between the syringe heater 40 and the rest of the dispensing system 10.

Now referring back to FIGS. 3 and 4, the syringe heater 40 may be secured within the dispensing system 10 by the cap seat 19. After an operator of the dispensing system 10 has inserted a syringe into the syringe cavity 202 of the syringe heater 40, the cap 18 is secured to the cap seat 19, as described above. Upon securing the cap 18 to the cap seat 19, the operator can initiate operation of the dispensing system 10, which begins with pumping pressurized air through an air passage 23 that extends through the input connector 22, which extends through the passage 168 (FIG. 5) of the cap 18. The pressurized air then enters the syringe (not shown) and forces material within the syringe out of the second end 200*b* of the housing 200 of the syringe heater 40 (FIGS. 7 and 8), and into a connector channel 45 defined by a syringe connector 44. When the syringe heater 40 is fully inserted into the dispensing system 10, the syringe connector 44 is configured to extend through the second end 200*b* of the housing 200 and engage the syringe, and thus provide a path for flowing material from the syringe.

Continuing with FIGS. 3-4 and 9-10, the syringe connector 44 is disposed within the dispensing system 10 between the syringe heater 40 and a plate assembly 47. The plate assembly 47, which is located at the lower end of the dispensing system 10, provides a pathway for the material to flow from the syringe heater 40 to the jetting dispenser assembly 300, which will be described below. The plate assembly 47 may include a plurality of plates, such as a top plate 48 and a bottom plate 52 that are releasably coupled together to form the plate assembly 47. However, the plate assembly 47 may include more than two plates. For example, the plate assembly 47 may include three, four, or more plates as desired. In the depicted embodiment, the top plate 48 defines a top surface 48*a* and a bottom surface 48*b* opposite the top surface 48*a* along the vertical direction 6, and the bottom plate 52 defines a top surface 52*a* and a bottom surface 52*b* opposite the top surface 52*a* along the vertical direction 6. When the plate assembly 47 is fully assembled, the bottom surface 48*b* of the top plate 48 may contact the top surface 52*a* of the bottom plate 52, such that the top plate 48 is disposed above the bottom plate 52 along the vertical direction 6. The top plate 48 and the bottom plate 52 may be releasably coupled via a plurality of threaded fasteners 57 that extend through the bottom plate 52 and engage the top plate 48, while the top plate 48 can be releasably coupled to the housing 58 through a plurality of threaded fasteners 57 that extend through the top plate 48 and engage the housing 58. However, other methods of releasably coupling the top and bottom plates 48 and 52 are contemplated. For example, the top and bottom plates 48 and 52 may be coupled by snap fit engagement, dovetail slot structure, etc. The plate assembly 47 may comprise a heating block, such that the top and bottom plates 48 and 52 are configured to heat material that passes through the plate assembly 47, thus ensuring that the material maintains optimal qualities for flow and dispensing.

Figure 10:
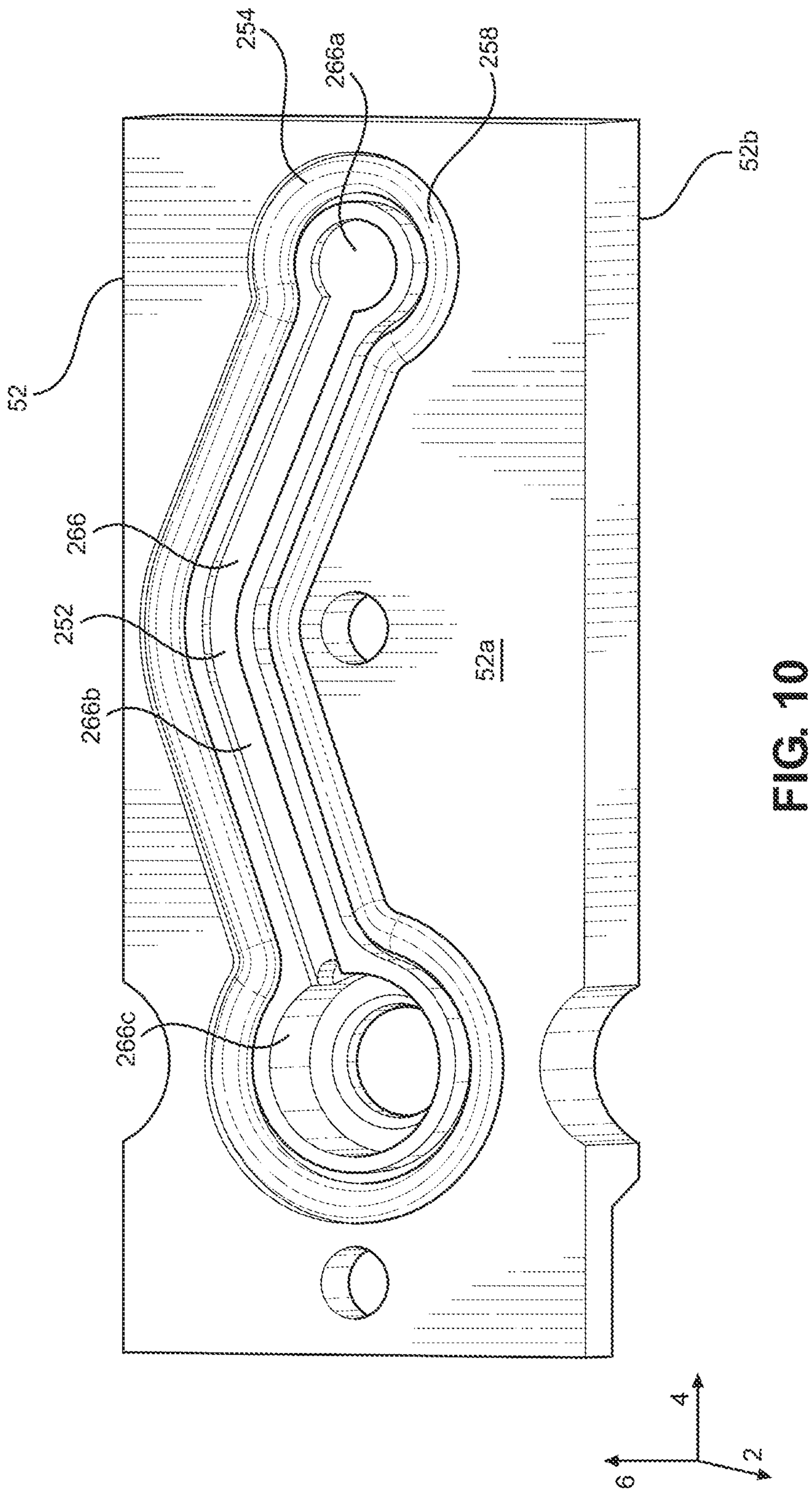
FIG. 10 is a perspective view of a bottom plate and seal of the dispensing system shown in FIG. 1.

The top plate 48 defines a first channel 250 that extends from the top surface 48*a* of the top plate 48 to the bottom surface 48*b*. The first channel 250 is configured to receive a portion of the syringe connector 44, and thus receive the flow of material from the syringe contained within the syringe heater 40. The first channel 250 is open to a first portion 266*a* of a recess 266. Referring to FIG. 10, the bottom plate 52 defines a recess 266 that extends from the top surface 52*a* of the bottom plate 52 towards the bottom surface 52*b* along the vertical direction 6. The recess 266 defines a portion of the plate channel 252, which receives the flow of material from the first channel 250 of the top plate 48 and directs the material through the plate assembly 47. When the plate assembly 47 is fully assembled, the plate channel 252 is fully defined by the recess 266 of the bottom plate 52 and the bottom surface 48*b* of the top plate 48, such that the plate channel 252 is fully enclosed. The recess 266 defines a first, second, and third portion 266*a*, 266*b*, and 266*c*, and directly illustrates the flow path of material through the plate channel 252. The first portion 266*a* of the recess 266 is in direct fluid communication with the first channel 250, which receives the flow of material from the syringe connector 44. The third portion 266*c* of the recess, along with a second channel 262 defined by the top plate 48, is configured to receive a portion of the jetting dispenser assembly 300, which will be described further below. The second portion 266*b* of the recess directs the flow of material through the plate assembly 47 from the first portion 266*a* to the second portion 266*b*.

The bottom plate 52 may also define a seal recess 258 that extends from the top surface 52*a* of the bottom plate 52 towards the bottom surface 52*b* along the vertical direction 6. The seal recess 258 may be configured to substantially surround the recess 266 without intersecting the recess 266. The seal recess 258 may receive a seal 254 that extends throughout an entirety of the seal recess 258, and thus also substantially surrounds the recess 266. When the plate assembly 47 is fully assembled the seal 254 is disposed between the top and bottom plates 48 and 52, such that the seal 254 contacts both the top and bottom plates 48 and 52. This arrangement helps prevent material from leaking from the plate channel 252 when material is flowing through the plate assembly 47. The bottom surface 48*b* of the top plate 48 may define a corresponding seal recess that is configured to receive a portion of the seal 254. Alternatively, the bottom surface 48*b* of the top plate 48 may be substantially planar, such that the bottom surface 48*b* biases the seal 254 into the seal recess 258 of the bottom plate 52, thus increasing the quality of the seal between the seal 254 and the top and bottom plates 48 and 52.

The use of the plate assembly 47 to direct fluid from the syringe connector 44 provides several advantages. The plate channel 252 may help to reduce the total flow volume of the material as it passes through the dispensing system 10. A reduced flow volume helps minimize material that becomes trapped within the applicator, which helps reduce the frequency with which the dispensing system 10 must be deactivated for cleaning. A reduced flow volume also helps ensure a consistent material pressure within the dispensing system 10, which increases accuracy of the jetting dispenser assembly 300. In one embodiment, the total flow volume of the dispensing system 10 is defined by a combination of the syringe cavity 202 of the syringe heater 40, the connector channel 45 of the syringe connector 44, the first channel 250 of the top plate 48, the plate channel 252 of the plate assembly 47, and the second channel 262 of the top plate 48. The total flow volume may be about 0.232 cubic centimeters.

The use of the plate assembly 47 to direct fluid from the syringe connector 44 may also increase the ability of an operator of the dispensing system 10 to completely flush material from the plate channel 252. Traditionally, many material dispensers include channels that are completely enclosed and thus do not provide operators with complete access to the flow paths they contain. Given that the plate channel 252 is defined by the recess 266 of the bottom plate 52 and the bottom surface 48*b* of the top plate 48, the entirety of the plate channel 252 can be accessed upon disassembly of the plate assembly 47. This allows an operator of the dispensing system 10 to simply and effectively flush trapped material from the plate channel 252, which prolongs the time that the dispensing system 10 can be operated between cleaning cycles.

Figure 9:
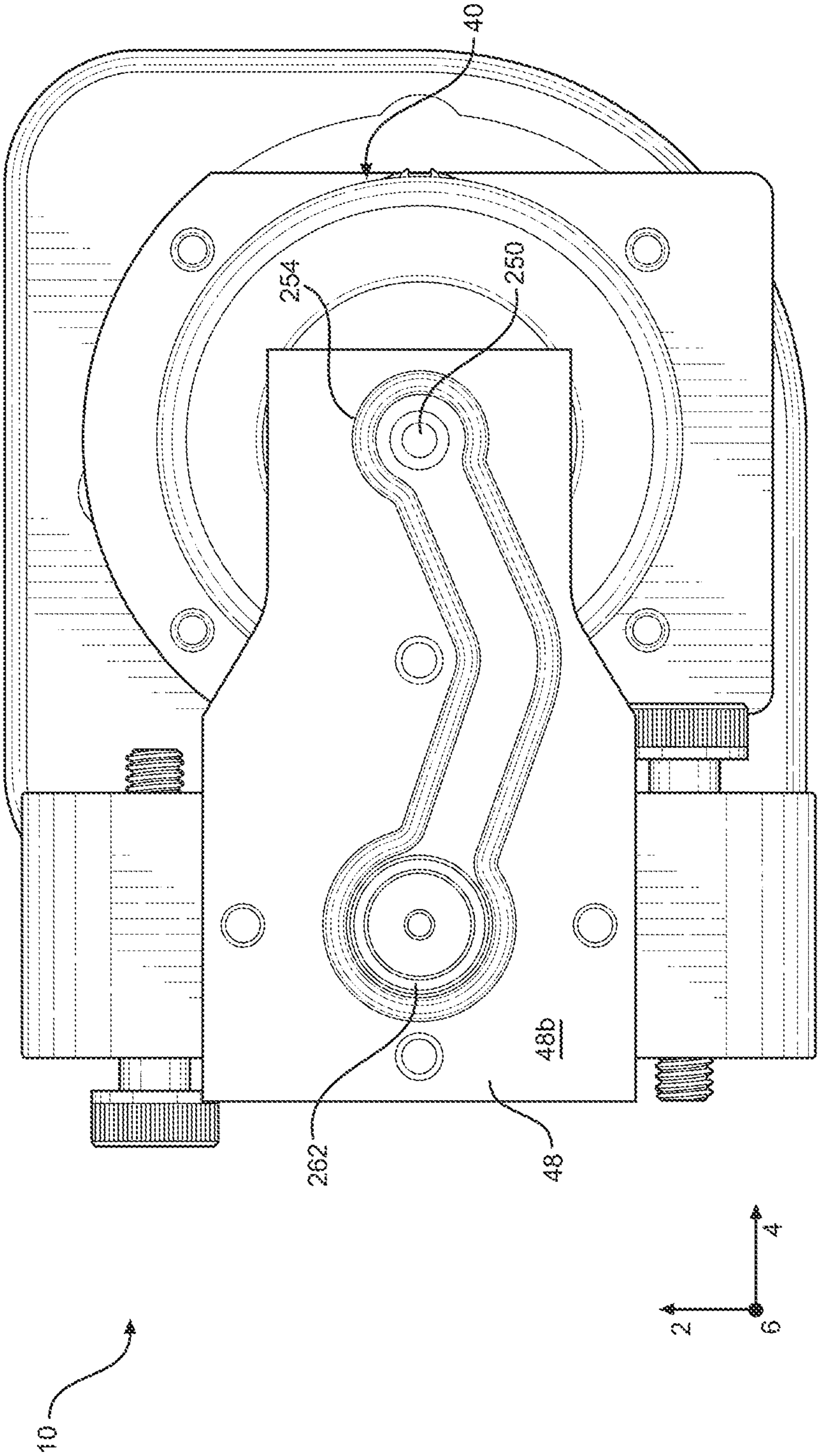
FIG. 9 is a bottom view of the dispensing system shown in FIG. 1, with the cover and bottom plate hidden.
Figure 11:
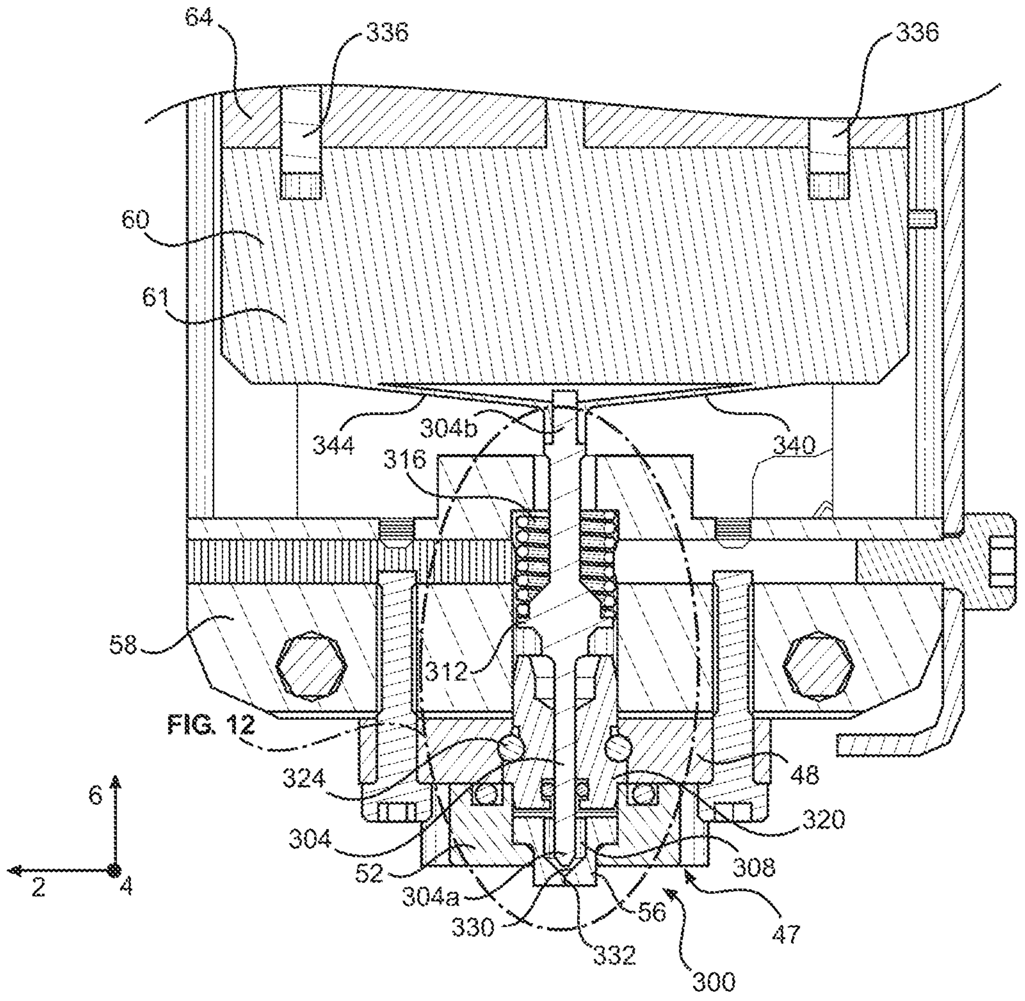
FIG. 11 is an cross-sectional view of the dispensing system shown in FIG. 1, taken along the line 11-11 shown in FIG. 3.
Figure 12:
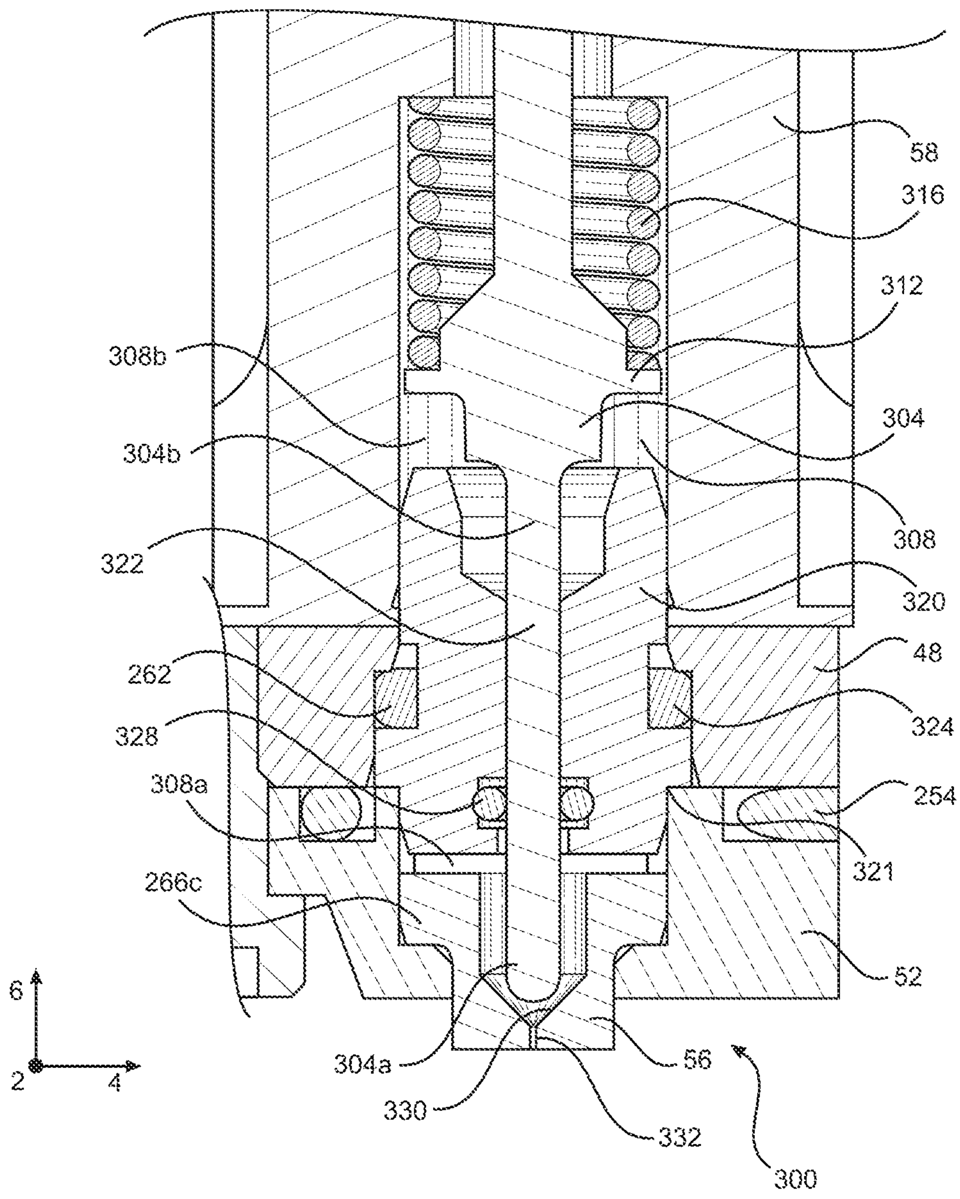
FIG. 12 is an enlarged view of the encircled region of the dispensing system shown in FIG. 11.

Continuing with FIGS. 9 and 11-12, the second channel 262 of the top plate 48, the third portion 266*c* of the recess 266, which is defined by the bottom plate 52, and a housing 58 define a dispensing chamber 308. The housing 58 can be spaced from, but directly adjacent to, the top plate 48 along the vertical direction 6. The spacing between the housing 58 and the top plate 48 creates a thermal barrier that limits heat transfer between these components. The jetting dispenser assembly 300 is configured to be disposed within the dispensing chamber 308. The jetting dispenser assembly 300 includes a nozzle 56 that is configured to be received in the third portion 266*c* of the recess 266. The nozzle 56 defines a valve seat 330 and a discharge passageway 332 that extends from the third portion 266*c* of the recess 266 to the exterior of the dispensing system 10. The discharge passageway 332 is the conduit by which material exits the dispensing system 10 and is applied to a substrate.

The jetting dispenser assembly 300 further includes a needle 304 that extends through and is movable within the dispensing chamber 308. The needle 304 defines a needle tip 304*a* and a needle stem 304*b* that extends away from the needle tip 304*a* along the vertical direction 6. The needle tip 304*a* may be configured to engage the valve seat 330 to form a seal, such that when the needle tip 304*a* engages the valve seat 330, material is prevented from flowing through the discharge passageway 332. As such, the needle 304 is moveable within the dispensing chamber 308 between a first and second position along the vertical direction 6. In the first position, the needle tip 304*a* is spaced from the valve seat 330 along the vertical direction, which allows the material to access the discharge passageway 332. In the second position, the needle tip 304*a* engages the valve seat 330, thus preventing material from entering the discharge passageway 332. In a jetting dispenser assembly 300 such as the one depicted, actuation of the needle from the first position to the second position causes the needle tip 304*a* to force material through the discharge passageway 332 in a jetting motion. This jetting motion may be repeated rapidly, which allows for discrete amounts of material to be applied to a substrate. The needle tip 304*a* and the valve seat 330 may be configured to have complementary shapes to prevent material leakage. In one embodiment, the needle tip 304*a* and the valve seat 330 may comprise complementary hemispherical shapes. Alternatively, the needle tip 304*a* and the valve seat 330 may comprise complementary flat shapes. The mechanism by which the needle 304 is actuated between the first and second positions will be described further below.

The jetting dispenser assembly 300 further includes a seal pack 320 that is configured to be received within the dispensing chamber 308. Specifically, the seal pack 320 divides the dispensing chamber into two sections—a first section 308*a*, which is below the seal pack 320 along the vertical direction 6, and a second section 308*b*, which is above the seal pack 320 along the vertical direction 6. The seal pack 320 defines a ledge 321 that is configured to engage the top surface 52*a* of the bottom plate 52, which vertically positions the seal pack 320 within the dispensing chamber 308. The seal pack also defines a seal pack passageway 322 that extends through the seal pack 320 along the vertical direction 6. The seal pack passageway 322 is configured to receive the needle stem 304*b*, such that the needle extends through the second section 308*b* of the dispensing chamber 308, through the seal pack 320, and into the first section 308*a* of the dispensing chamber 308. The seal pack 320 may house a seal 328 within the seal pack passageway 322 that substantially surrounds the needle stem 304*b*. The seal 328 may function to prevent material from flowing from the first section 308*a* of the dispensing chamber 308 into the second section 308*b* through the seal pack passageway 322. Additionally, the jetting dispenser assembly 300 may also include a seal 324 disposed around the seal pack 320 between the seal pack 320 and the top plate 48. The seal 324 may prevent material from flowing between the seal pack 320 and the top and bottom plates 48 and 52 from the first section 308*a* of the dispensing chamber 308 into the second section 266*b*. Alternatively, the seal 324 may be disposed around the seal pack between the seal pack 320 and the bottom plate 52. As such, the seals 324 and 328 aid in keeping the material within the first section 308*a* of the dispensing chamber 308 after the material exits the first channel 250 and before the material exits the discharge passageway 332.

Additionally, the jetting dispenser assembly 300 includes a spring 316 disposed within the second section 308*b* of the dispensing chamber 308. The spring 316 is disposed between a portion of the housing 58 that defines the upper end of the second section 308*b* of the dispensing chamber 308 and a ledge 312 defined by the needle 304. The spring 316 may be placed within the jetting dispenser assembly 300 in a naturally compressed state, such that the spring 316 constantly applies a downward force to the ledge 312. This downward force on the ledge 312 of the needle 304 biases the needle 304 downward along the vertical direction 6. As such, the spring 316 naturally bias the needle 304 into the second position, such that an upward force on the needle 304 is required to displace the needle tip 304*a* from the valve seat 330, and thus transition the needle from the second position to the first position.

Now referring to FIGS. 3-4 and 11-14B, the jetting dispenser assembly 300 also includes an actuator 60 operatively coupled to the needle 304. The actuator 60 includes a shell 61, which is configured to contain a piezoelectric device and a pair of movable actuator arms 340 and 344. The shell 61 may be comprised of a dissimilar metal or metal alloy as compared to adjacent components in the dispensing system 10 to protect the piezoelectric element and provide for heat dissipation. The actuator arms 340 and 344 may extend diagonally from respective corners of the piezoelectric device in a direction towards each other and the top end of the needle stem 304*b*. A connector 348 is configured to connect the pair of actuator arms 340 and 344 together, as well as secure the actuator arms 340 and 344 to the upper end of the needle stem 304*b*. The connector 348 may include a pair of locking tabs 352 that project radially inwards toward each other. The locking tabs 352 may be configured to releasably engage locking notches 353 defined by the upper end of the needle stem 304*b*. However, the needle 304 may engage the connector 348 through other means. For example, the connector 348 and the needle stem 304*b* may be releasably attached via a threaded engagement.

The piezoelectric device in the actuator 60 is configured to translate the needle 304 between the first and second positions. The actuator 60 may be coupled to a controller (not shown) external to the dispensing system 10 that controls operation of the actuator 60. The actuator 60 is also coupled to a power source (not shown) that provides power to the piezoelectric device. As noted above, the needle 304 is in the second position in a neutral state, such that the needle tip 304*a* engages the valve seat 330. To transition the needle 304 to the first position, the controller directs the power source to provide a positive charge to the piezoelectric device. This positive charge causes the piezoelectric device, which may be a piezoelectric stack, to expand, which pulls the actuator arms 340 and 344 toward the shell 61. Thus, the actuator arms 340 and 344 and the needle 304 are pulled toward the shell, causing the needle tip 304*a* to draw away from the valve seat 330. When the controller directs the power source to cease providing the positive charge to the piezoelectric device, the piezoelectric device retracts, which pushes the actuator arms 340 and 344 away from the shell 61. This retraction of the piezoelectric device, along with the force applied by the spring 316 to the ledge 312 of the needle 304, forces the needle 304 downward such that the needle tip 304*a* impacts the valve seat 330. When the needle tip 304*a* impacts the valve seat 330, material is jetted through the discharge passageway 332 of the nozzle 56.

The actuator 60 may be connected to a lower block 64 via fasteners 336. Collectively, the actuator 60 and the lower block 64 define an actuator assembly 59. The lower block 64 may be disposed between the first and second plates 70*a* and 70*b*, which are spaced apart along the lateral direction 4. The first and second plates 70*a* and 70*b* may each define at least one slot that is configured to allow a fastener to extend through. In the depicted embodiment, the first plate 70*a* defines a first slot 362*a* and a second slot 362*b* and the second plate 70*b* defines a first slot 368*a* and a second slot 368*b*, each of which may be elongate along the vertical direction 6. The slots 362*a*, 362*b*, 368*a*, 368*b* are positioned such that fasteners, such as fastener 74, extend through the slots 362*a*, 362*b*, through the lower block 64, through the slots 368*a*, 368*b*, and engage a nut, such as nut 75, which is disposed adjacent to second plate 70*b*. The fasteners 74 may be threaded to engage the nuts 75 such that the fasteners 74 may be loosened from and tightened to the first and second plates 70*a*, 70*b*. When the fasteners 74 and nuts 75 are fully tightened in an engaged configuration, the fasteners 74 and nuts 75 are compressed against the first and second plates 70*a*, 70*b* and the fasteners 74 are not movable within the first and second slots 362*a*, 362*b*. This compression fixes the location of the actuator assembly 59 relative to the first and second plates 70*a*, 70*b*, and the action of fully tightening the fasteners 74 and nuts 75 may be referred to as engaging the actuator assembly 59 with the first and second plates 70*a*, 70*b*. However, when the fasteners 74 and nuts 75 are loosened, the fasteners 74 may translate within the first and second slots 362*a*, 362*b* along the vertical direction 6. This allows the actuator assembly 59 to likewise translate along the vertical direction 6. Loosening the fasteners 74 and nuts 75 may also be referred to as disengaging the actuator assembly 59 from the first and second plates 70*a*, 70*b*. In another embodiment, the first and second slots 362*a*, 362*b*, 368*a*, 368*b* and the fastener 74 are replaced with a solenoid or other automatic clamping mechanism that allows the position of the actuator assembly 59 to be fixed and unfixed relative to the first and second plates 70*a* and 70*b* electronically without any manual actuation mechanism.

The actuator 60 may be moved along the vertical direction 6 to alter the stroke length of the needle 304. The stroke length is defined as the distance between the second position, where the needle tip 304*a* engages the valve seat 330, and the first position, where the needle tip 304*a* is spaced a maximum distance from the valve seat 330. The stroke length may be changed to accommodate different dispensing operations, as determined by the operator of the dispensing system 10 or the controller (not shown). To increase the stroke length, the fasteners 74 and nuts 75 are loosened from the first and second plates 70*a*, 70*b* thus allowing the actuator assembly 59 to be moved upwards along the vertical direction 6. The controller then directs the power source to provide a negative charge to the piezoelectric device. This negative charge causes the piezoelectric device to retract from its neutral position and the actuator arms 340, 344 to push the shell 61 upwards. Because the actuator assembly 59 is no longer restrained relative to the first and second plates 70*a*, 70*b*, the actuator assembly 59 moves upwards along the vertical direction 6 between the first and second plates 70*a*, 70*b*. When the actuator assembly 59 has ceased moving and is in the desired position, the operator can tighten the fastener 74 and nut 75, which again fixes the position of the actuator 60 relative to the first and second plates 70*a* and 70*b*. The controller then directs the power source to cease providing the piezoelectric device with the negative charge, and the piezoelectric device expands to its neutral state.

In contrast, to decrease the stroke length, the controller directs the power source to provide a positive charge to the piezoelectric device when the fasteners 74 and nuts 75 are loosened from the first and second plates 70*a*, 70*b*. The positive charge causes the piezoelectric device to expand from its neutral position and the actuator arms 340, 344 to pull the shell 61 downwards. Because the actuator assembly 59 is no longer restrained relative to the first and second plates 70*a*, 70*b*, the actuator assembly 59 moves downwards along the vertical direction 6 between the first and second plates 70*a*, 70*b*. When the actuator assembly 59 has ceased moving, the operator can tighten the fasteners 74 and nuts 75, which again fixes the position of the actuator 60 relative to the first and second plates 70*a* and 70*b*.

The alteration of the position of the actuator 60 via expansion and contraction of the piezoelectric device serves several purposes. In previous designs, the stroke setting may be altered by manually moving the actuator 60. However, this can only be done with the level of accuracy that the individual operator is capable of providing. As the alteration is done manually, there is inherently some level of inaccuracy. By altering the stroke length by expanding and contracting the piezoelectric device, the stroke length can be set with a higher accuracy. The controller may be programmed to contain a variety of stroke lengths, as well as the corresponding voltages that must be applied to the piezoelectric device to achieve those stroke lengths. The operator must simply select the desired stroke length, and the controller will direct the power source to provide the piezoelectric device with the corresponding voltage required to create the desired stroke length. This may increase the accuracy of the resulting stroke length when compared to the desired stroke length, which increases the accuracy and consistency of the resulting material jetting process. Additionally, the alteration of the stroke length using the piezoelectric device may shorten the time required to move the actuator 60, as physical objects such as shims, locking threads, etc. will not be required to manually set the position of the actuator 60.

Figure 13:
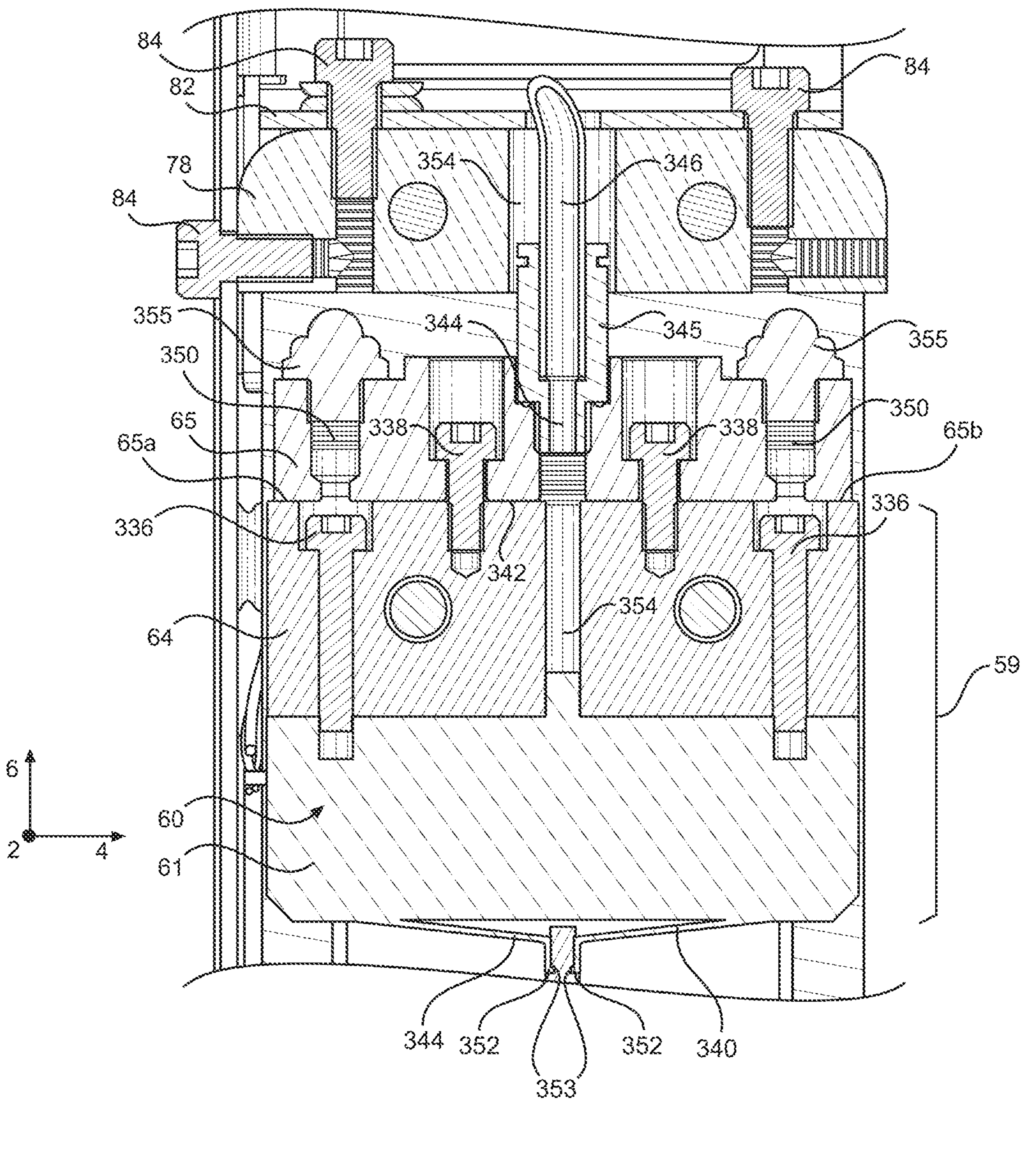
FIG. 13 is an alternative cross-sectional view of the dispensing system shown in FIG. 1, taken along line 11-11 shown in FIG. 3.
Figure 14A:
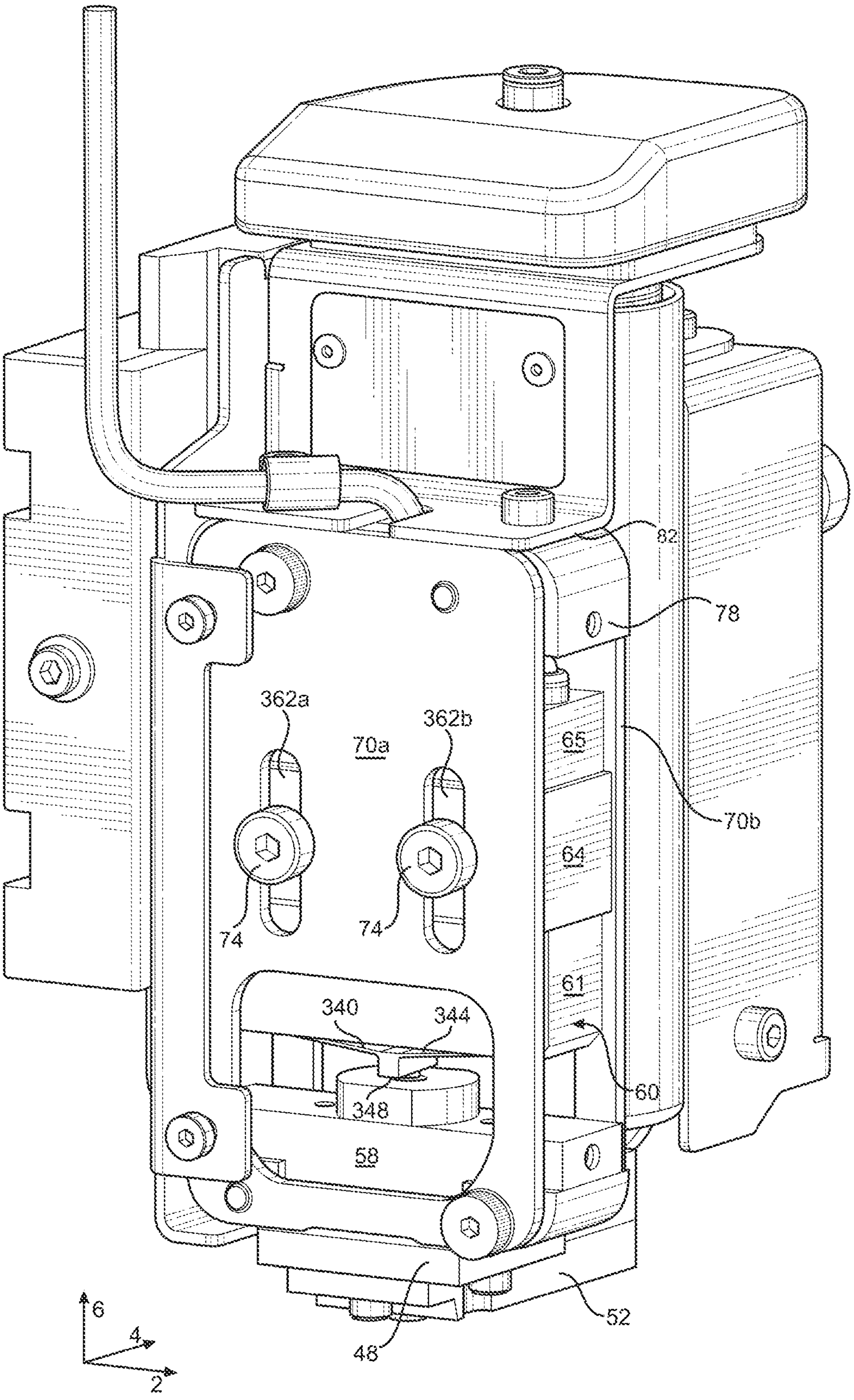
FIG. 14A is a perspective view of the dispensing system shown in FIG. 1, with the cover removed.
Figure 14B:
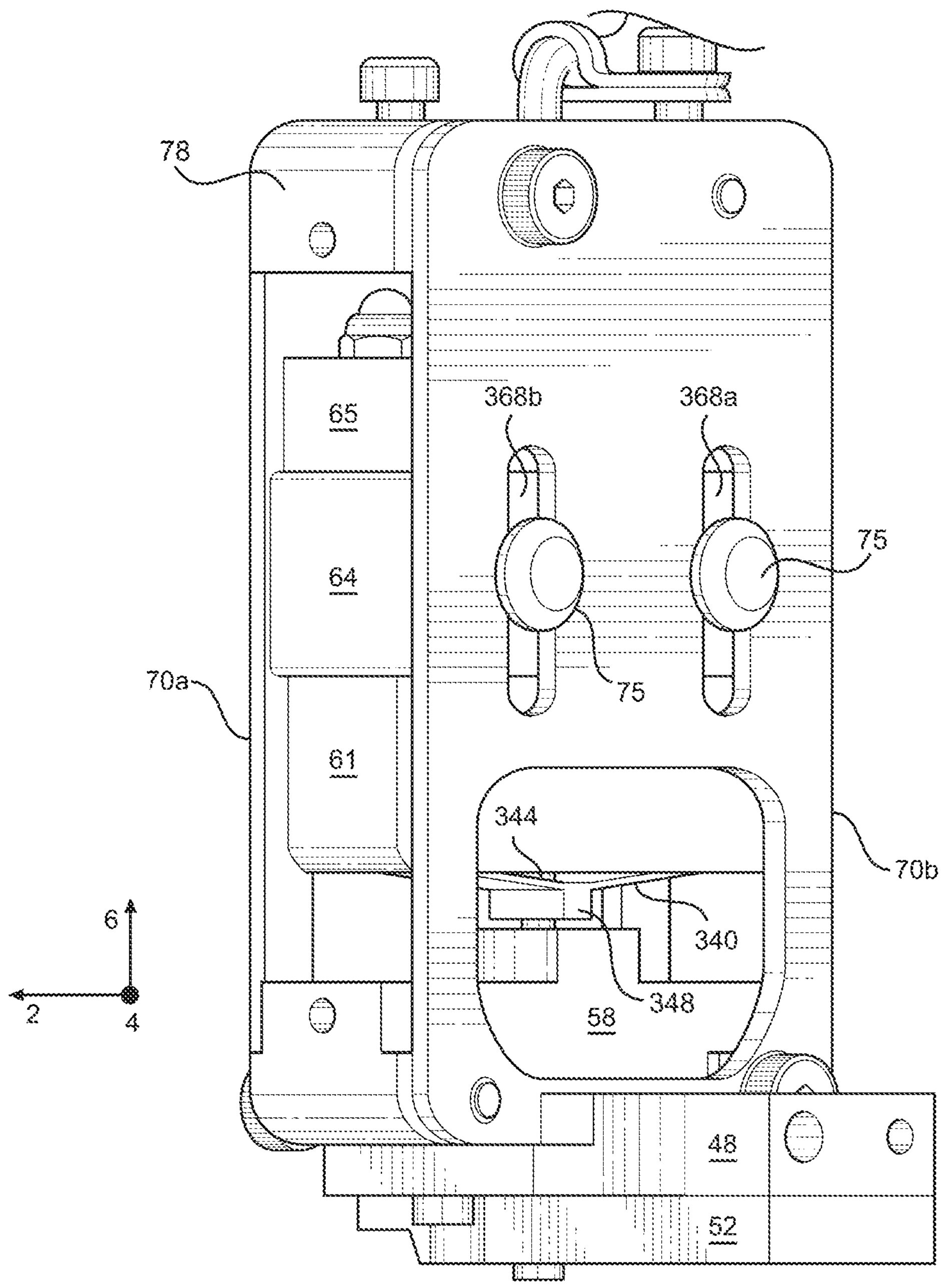
FIG. 14B is an alternative perspective view of the dispensing system shown in FIG. 1, with the cover removed.

Continuing with FIGS. 13-14B, the dispensing system 10 further includes an upper block 65 attached to the lower block 64 through fasteners 338. Unlike the lower block 64 and shell 61, which may be in close contact when connected to each other, the upper block 65 may only contact the lower block at its outer edge, which can include first and second outer edges 65*a*, 65*b*, where the first and second outer edges 65*a*, 65*b* are spaced apart along the longitudinal direction 2. As such, an air gap 342 can be defined between the upper and lower blocks 65, 64 between the first and second outer edges 65*a*, 65*b*. The function of the air gap 342 will be described further below.

Referring to FIG. 13, the dispensing dispensing system 10 further includes a stop 78 disposed above the upper block 65 along the vertical direction 6. The stop 78, which is positioned between the first and second plates 70*a* and 70*b*, is affixed to a plate 82, as well as the first and second plates 70*a*, 70*b*, via fasteners 84. The stop 78 defines a central channel 354 that extends through the stop 78 along the vertical direction 6. The central channel 354 is configured to allow a tube 346 and a connector 345 to pass through. The connector 345 is received within a central channel 354 that extends through the upper block 65, such that the connector 345 is fixedly attached to the upper block 65. The tube 346 can be comprised of a flexible material, such as a polymer, which allows the tube 346 to be attached to the connector 345 through an interference fit. However, other methods of attaching the tube 346 to the connector 345 are contemplated. The tube 346 extends from the connector 345, outside the dispensing system 10, and to a pressurized air source (not shown) external to the dispensing system 10. In operation, heat emanating from the lower block 64 is transferred to the air disposed within the air gap 342 rather than to the upper block 65, which would otherwise occur if the air gap 342 did not exist. The tube 346 receives pressurized air from the air source, and directs the pressurized air through the tube 346, through the connector 345, and into the air gap 342. The air then becomes heated within the air gap 342 and is permitted to escape from the air gap 342 through one of the escape passages 350 that extends through the upper block 65. Though two escape passages 350 are depicted, the dispensing system 10 can include more or less as desired. Each of the escape passages 350 can be configured to receive a muffler 355. The mufflers 355 can be configured to both limit the flow rate of the heated air escaping the air gap 342, as well as limit noise related to this air release. The mufflers 355 can also function to prevent external contaminants from entering the air gap 342.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features, and concepts may be expressly identified herein as being inventive or forming part of an invention, such identification is not intended to be exclusive, but rather there may be inventive aspects, concepts, and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. A heater for heating material in a dispensing system comprising:

- a housing that defines a first end, a second end opposite the first end, and a cavity that extends from the first end to the second end, wherein the cavity is configured to receive a supply of material, the housing further defining an outer surface that includes a first helical groove and a second helical groove, wherein the first and second helical grooves extend from the first end to the second end;
- a temperature sensor disposed in the first helical groove;
- a heater wire disposed in the second helical groove;
- an insulating layer disposed around the housing; and
- a sleeve disposed around the insulating layer.

2. The heater of claim 1, wherein the insulating layer comprises polyimide tape, and the insulating layer is configured to electrically and thermally insulate the housing.

3. The heater of claim 1, wherein the sleeve is a heat-shrink braided sleeve.

4. The heater of claim 1, wherein the first helical groove defines a first diameter and the second helical groove defines a second diameter, wherein the first and second diameters are different.

5. The heater of claim 1, wherein the cavity is configured to receive a syringe that contains the supply of material.

6. The heater of claim 1, wherein a portion of first and second ends of the temperature sensor and the heater wire are exposed and uncovered by the insulating layer.

7. The heater of claim 1, wherein the sleeve defines a slot or notch, through which first and second ends of the temperature sensor and the first and second ends of the heater wire extend, thereby allowing the first and second ends of the temperature sensor and the first and second ends of the heater wire to connect to electrical elements of a dispensing system.

8. The heater of claim 1, wherein the temperature sensor extends through an entire length of the first helical groove, and continues to extend such that the first end of the temperature sensor is disposed outside the first helical groove at the first end of the housing, and the second end of the temperature sensor is disposed outside the first helical groove at the second end.

9. The heater of claim 1, wherein the temperature sensor is disposed in the first helical groove, such that the temperature sensor extends helically around the housing from the first end to the second end.

10. The heater of claim 1, wherein the heater wire is disposed in the second helical groove, such that the heater wire extends helically around the housing from the first end to the second end.

11. The heater of claim 1, wherein the heater wire extends through an entire length of the second helical groove, and continues to extend such that the first end of the heater wire is disposed outside the second helical groove at the first end of the housing, and the second end of the heater wire is disposed outside the second helical groove at the second end.

12. A dispensing system for dispensing hot melt adhesive comprising:

- the heater of claim 1.

13. The dispensing system of claim 12, wherein the heater is a syringe heater.

14. The dispensing system of claim 12, further comprising:

- a jetting dispenser assembly configured to jet hot melt adhesive received from the heater.

15. The dispensing system of claim 14, further comprising:

- a plate assembly that defines a plate channel configured to transport the hot melt adhesive from the heater to the jetting dispenser assembly.

16. The dispensing system of claim 15, wherein plate assembly includes a top plate and a bottom plate that each partially defines the plate channel that is in fluid communication with the heater and the jetting dispenser assembly, whereby the plate assembly, which is located at a lower end of the dispensing system, provides a pathway for the material to flow from the heater to the jetting dispenser assembly.

* * * * *